(12) United States Patent
Schaus et al.

(10) Patent No.: US 12,519,978 B1
(45) Date of Patent: Jan. 6, 2026

(54) ALPHA BLOCK TRANSFORMS FOR ALPHA CHANNEL COMPRESSION

(71) Applicant: Amazon Technologies, Inc., Seattle, WA (US)

(72) Inventors: Steven Schaus, Hermosa Beach, CA (US); Christopher Healy, Orange, CA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 18/757,329

(22) Filed: Jun. 27, 2024

(51) Int. Cl.
| | |
|---|---|
| *H04N 11/02* | (2006.01) |
| *H04N 19/119* | (2014.01) |
| *H04N 19/136* | (2014.01) |
| *H04N 19/172* | (2014.01) |
| *H04N 19/176* | (2014.01) |
| *H04N 19/186* | (2014.01) |
| *H04N 19/60* | (2014.01) |

(52) U.S. Cl.
CPC ........... *H04N 19/60* (2014.11); *H04N 19/119* (2014.11); *H04N 19/136* (2014.11); *H04N 19/172* (2014.11); *H04N 19/176* (2014.11); *H04N 19/186* (2014.11)

(58) Field of Classification Search
CPC .................................................... H04N 19/60
USPC ............................................. 375/240.01–29
See application file for complete search history.

(56) References Cited

U.S. PATENT DOCUMENTS

| | | | | |
|---|---|---|---|---|
| 8,655,086 B1* | 2/2014 | Christensen | ........... | H04N 19/70 382/233 |
| 2002/0044599 A1* | 4/2002 | Boyer | .................... | H04N 19/61 375/240 |
| 2004/0008790 A1* | 1/2004 | Rodriguez | ........... | H04N 19/117 375/E7.199 |
| 2005/0097341 A1* | 5/2005 | Francis | .................... | G06F 21/72 713/189 |
| 2005/0286634 A1* | 12/2005 | Duvivier | .............. | H04N 19/174 375/E7.176 |
| 2006/0114987 A1* | 6/2006 | Roman | ................ | H04N 19/132 375/E7.184 |
| 2007/0019869 A1* | 1/2007 | Strom | .................. | H04N 19/103 382/233 |
| 2009/0067509 A1* | 3/2009 | Poon | ...................... | G09G 5/363 375/240.26 |
| 2010/0322302 A1* | 12/2010 | Rodriguez | ........... | H04N 19/102 375/E7.026 |

(Continued)

*Primary Examiner* — Leron Beck
(74) *Attorney, Agent, or Firm* — K&L Gates LLP

(57) ABSTRACT

Systems and techniques are described for Alpha channel inter-frame and intra-frame compression. An example method includes receiving a first frame representative of a graphical user interface at a first time and a second frame representative of the graphical user interface at a second time. The example includes dividing the first frame and the second frame into respective blocks. The example includes searching the frames for at least one target block that share a common value with at least one other block in either the first frame and/or the second frame. The example includes applying at least one transform to the at least one target block that references either the common value or the at least one other block in either the first frame and/or the second frame. The example includes replacing the at least one target block with a transform block.

20 Claims, 11 Drawing Sheets

(56) References Cited

U.S. PATENT DOCUMENTS

| | | | |
|---|---|---|---|
| 2015/0036734 A1* | 2/2015 | Hendry | H04N 19/85 375/240.02 |
| 2015/0042659 A1* | 2/2015 | Holland | H04N 19/182 345/428 |
| 2015/0304663 A1* | 10/2015 | Solaja | A63F 13/77 375/240.24 |
| 2015/0338648 A1* | 11/2015 | Tait | A63F 13/825 463/31 |
| 2016/0088313 A1* | 3/2016 | Fenney | H04N 19/15 382/234 |
| 2016/0191937 A1* | 6/2016 | Döffinger | H04N 19/196 375/240.24 |
| 2018/0054630 A1* | 2/2018 | Chang | H04N 19/17 |
| 2018/0352190 A1* | 12/2018 | Shah | H04N 21/234381 |
| 2024/0022750 A1* | 1/2024 | Seong | H04N 19/134 |

\* cited by examiner

```
                    Frame Header 600

0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Frame Type    |              Frame Length                     |
+-+-+-+-+-+-+-+-+-+-+-+-+-+-+-+-+-+-+-+-+-+-+-+-+-+-+-+-+-+-+-+-+
| Frame Length  |         Additional Information           . . .
+-+-+-+-+-+-+-+-+-+-+-+-+-+-+-+-+-+-+-+-+-+-+-+-+-+-+-+-+-+-+-+-+
```

```
+-------------------------------------------------------------+
|                    Block Raw Header 702                     |
|  0                   1                   2                3 |
|  0 1 2 3 4 5 6 7 8 9 0 1 2 3 4 5 6 7 8 9 0 1 2 3 4 5 6 7 8 9 0 1 |
| +-+-+-+-+-+-+-+-+-+-+-+-+-+-+-+-+-+-+-+-+-+-+-+-+-+-+-+-+-+-+-+-+ |
| | Tform Type  |      Unique Block ID      |    Length     | |
| +-+-+-+-+-+-+-+-+-+-+-+-+-+-+-+-+-+-+-+-+-+-+-+-+-+-+-+-+-+-+-+-+ |
| |   Length    |        Raw Block Buffer              ...    |
| +-+-+-+-+-+-+-+-+-+-+-+-+-+-+-+-+-+-+-+-+-+-+-+-+-+-+-+-+-+-+-+-+ |
+-------------------------------------------------------------+
```

```
+-------------------------------------------------------------+
|                  Block Encoded Header 704                   |
|  0                   1                   2                3 |
|  0 1 2 3 4 5 6 7 8 9 0 1 2 3 4 5 6 7 8 9 0 1 2 3 4 5 6 7 8 9 0 1 |
| +-+-+-+-+-+-+-+-+-+-+-+-+-+-+-+-+-+-+-+-+-+-+-+-+-+-+-+-+-+-+-+-+ |
| | Tform Type  |      Unique Block ID      |    Length     | |
| +-+-+-+-+-+-+-+-+-+-+-+-+-+-+-+-+-+-+-+-+-+-+-+-+-+-+-+-+-+-+-+-+ |
| |   Length    |      Encoded Block Buffer           ...     |
| +-+-+-+-+-+-+-+-+-+-+-+-+-+-+-+-+-+-+-+-+-+-+-+-+-+-+-+-+-+-+-+-+ |
+-------------------------------------------------------------+
```

```
+-------------------------------------------------------------+
|                  Macroblock Raw Header 706                  |
|  0                   1                   2                3 |
|  0 1 2 3 4 5 6 7 8 9 0 1 2 3 4 5 6 7 8 9 0 1 2 3 4 5 6 7 8 9 0 1 |
| +-+-+-+-+-+-+-+-+-+-+-+-+-+-+-+-+-+-+-+-+-+-+-+-+-+-+-+-+-+-+-+-+ |
| | Tform Type  |      Unique Block ID      |    Length     | |
| +-+-+-+-+-+-+-+-+-+-+-+-+-+-+-+-+-+-+-+-+-+-+-+-+-+-+-+-+-+-+-+-+ |
| |   Length    |      Raw Macroblock Buffer          ...     |
| +-+-+-+-+-+-+-+-+-+-+-+-+-+-+-+-+-+-+-+-+-+-+-+-+-+-+-+-+-+-+-+-+ |
+-------------------------------------------------------------+
```

```
                Macroblock Constant Header 708

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Tform Type |     Unique Block ID       |      Value           |
+-+-+-+-+-+-+-+-+-+-+-+-+-+-+-+-+-+-+-+-+-+-+-+-+-+-+-+-+-+-+-+-+
```

```
                  Block Constant Header 710

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Tform Type |     Unique Block ID       |      Value           |
+-+-+-+-+-+-+-+-+-+-+-+-+-+-+-+-+-+-+-+-+-+-+-+-+-+-+-+-+-+-+-+-+
```

```
                  Coalesce Last Header 712

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Tform Type |     Unique Block ID       |     Ref Block ID    |
+-+-+-+-+-+-+-+-+-+-+-+-+-+-+-+-+-+-+-+-+-+-+-+-+-+-+-+-+-+-+-+-+
|   Ref Block ID    |
+-+-+-+-+-+-+-+-+-+-+-+
```

```
                 Coalesce Current Header 714

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Tform Type |     Unique Block ID       |     Ref Block ID    |
+-+-+-+-+-+-+-+-+-+-+-+-+-+-+-+-+-+-+-+-+-+-+-+-+-+-+-+-+-+-+-+-+
|   Ref Block ID    |
+-+-+-+-+-+-+-+-+-+-+-+
```

FIG. 7B

ALPHA BLOCK TRANSFORMS FOR ALPHA CHANNEL COMPRESSION

BACKGROUND

Streaming devices provide users with the ability to navigate and stream video content from various streaming applications. In addition to video content, streaming devices also receive Graphical User Interface (GUI) data for applications to render on a screen. The GUI of an application shows items that indicate actions that the user can perform and conveys information to the user. GUIs may be rendered using the Red Green Blue Alpha (RGBA) color space. Using the RGBA color space, each pixel is assigned a red intensity value, a green intensity value, and a blue intensity value. Each pixel is also assigned an Alpha value indicating the opacity for the pixel. Streaming devices may render video content and GUIs using a Graphics Processing Unit (GPU). Many GPU manufacturers utilize proprietary software for their GPUs.

BRIEF DESCRIPTION OF DRAWINGS

FIG. 6 illustrates an example frame header, in accordance with various aspects of the present disclosure.

FIG. 7A illustrates example headers associated with various block transforms, in accordance with various aspects of the present disclosure.

FIG. 7B illustrates example headers associated with various block transforms, in accordance with various aspects of the present disclosure.

DETAILED DESCRIPTION

Figure 1:
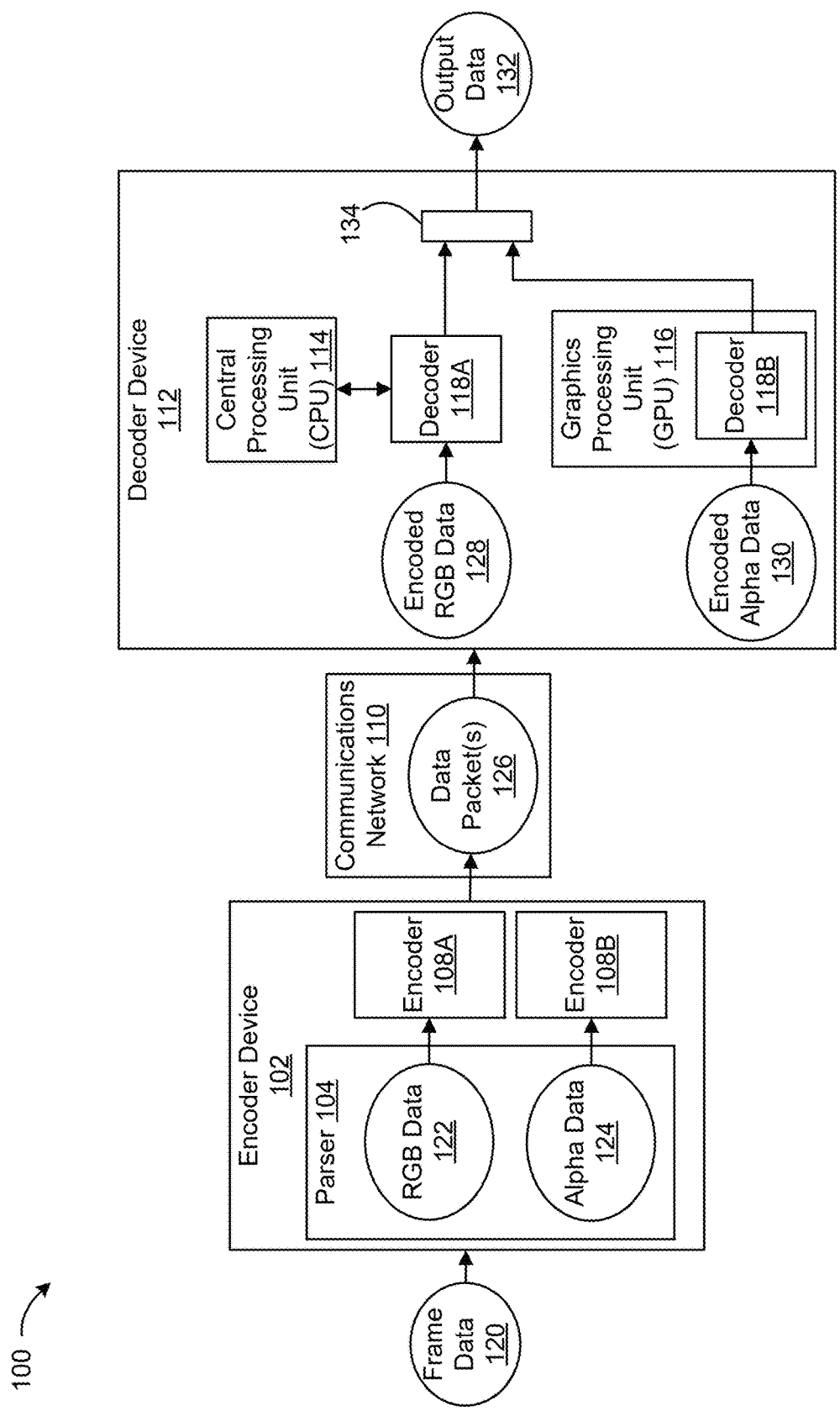
FIG. 1 illustrates example systems for encoding and decoding data, in accordance with various aspects of the present disclosure.

In the following description, reference is made to the accompanying drawings which illustrate several examples for the present disclosure. It is understood that other embodiments may be utilized and that mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Video streaming has become the preferred method for viewing media content for many users over recent years as smart televisions, streaming devices (e.g., streaming sticks, etc.), and streaming services (e.g., streaming movies, music, live events, television channels, etc.) have expanded. Many smart televisions can support a variety of streaming applications and those televisions that cannot directly support streaming applications can be connected to a streaming device which can render streaming applications and video content. Streaming devices may provide users with the ability to navigate various streaming applications and stream video content from various streaming libraries.

In order for users to navigate streaming applications, streaming devices may also receive Graphical User Interface (GUI) data for each respective streaming application to render on the television screen in addition to the streaming videos. The GUI of a streaming application may require the streaming device to render high resolution items to indicate actions (e.g., scroll through content, play videos, pause videos, etc.). In addition, the GUI may provide additional information to the user, such as descriptions of videos, video subtitles during viewing, using various graphical interface elements (e.g., subtitles, buttons, links, images, etc.). In order to provide these graphical interface elements, GUIs may be rendered by a streaming device on a television screen using the Red Green Blue Alpha (RGBA) color space. When using the RGBA color space, the streaming device, assigns each pixel of the television screen with a red intensity value, a green intensity value, and a blue intensity value to produce various colors (e.g., red, green, blue, yellow, purple, gray, white, black, etc.). Because a GUI may be at least partially transparent, each pixel is also assigned an Alpha value which controls the opacity for a respective pixel. For example, when browsing a streaming library the GUI of the streaming application may be solid (or non-transparent). When the user plays a video, the GUI is still at least partially present over the streaming video; however, the GUI may fade from solid (or non-transparent colors) to fully transparent so that a video can play on the full television screen without being obscured by the GUI.

Traditionally, GUI streaming is performed by dividing or breaking an RGBA GUI into a pair of NV12 buffers (e.g., a first NV12 buffer for the RGB channel and a second NV12 buffer for the Alpha channel). The streaming server encodes the pair of NV12 buffers using a video codec, such as H.264. The encoded pair of NV12 buffers are then streamed over the Internet to a receiver, such as a streaming stick or other streaming device, where the encoded pair of NV12 buffers are decoded by the CPU of the streaming device and fed to the Graphics Processing Unit (GPU). The GPU then reassembles the decoded pair of NV12 buffers back into an RGBA GUI which is rendered on the television screen.

One disadvantage of such traditional GUI streaming techniques is that the local streaming device (e.g., streaming stick, smart television, smartphone, etc.) requires more computational resources (e.g., CPU, memory, etc.) for video decoding which frequently maxes out the full capacity limitations of smaller streaming devices which often utilize integrated circuits (e.g., System on a Chip (SoC), etc.) for decoding video streams (e.g., video content, GUI streams, etc.). Often two or more high resolution (e.g., 1920×1080 at 60 FPS, etc.) video streams (using traditional streaming techniques) will require more Dynamic Random-Access Memory (DRAM) then is available to the streaming device.

For example, if a streaming application utilizes a 1920×1080 GUI at 60 FPS (Frames Per Second), a traditional streaming device (e.g., streaming stick, SoC, and/or the like) would need to decode a total of three video streams, two separate 1080p60 H.264 video streams for the GUI and a third video stream for the local video (e.g., 4K HDR movie, news broadcast, sporting event, etc.). Additionally or alternatively, traditional techniques for decoding of multiple high resolution video streams simultaneously and/or for extended periods of time, such as during streaming of feature length movies, may cause overheating of the streaming device by overwhelming the streaming devices thermal management system.

In contrast to the traditional systems and techniques described above, improved systems and techniques for encoding and decoding GUI video streams are described herein. The present disclosure sets forth systems, methods, and apparatuses that, among other things, provide improved encoding and/or decoding GUI video streams by leveraging Alpha block transforms for Alpha channel inter-frame and/or intra-frame compression. The present disclosure also sets forth systems, methods, and apparatuses that, among other things, provide improved encoding and decoding GUI video streams by leveraging the GPU hardware and/or software specific to a respective streaming device for local video decoding processes. There are many advantages of these and other examples described herein over traditional systems, such as those traditional systems described above.

One advantage of one or more approaches described herein is that such approaches may be used to improve the functioning of a streaming device (e.g., a streaming stick or other electronic streaming device). In some examples, an encoder device (e.g., a streaming server, etc.) may utilize one or more Alpha block transforms to reduce the amount of blocks and/or macroblocks that need to be decoded by the local streaming device (e.g., a client device, etc.) by referencing target values, pixels, blocks, and/or macroblocks within a single frame and/or between consecutive frames. For example, instead of encoding Alpha channel information for each macroblock and/or block of a GUI frame individually, when a GUI is fully transparent (e.g., during full screen video rendering) then a single value may be applied to all pixels within at least one block and/or macroblock of the GUI frame. In some examples, if the data in a particular block and/or macroblock does not change between two or more consecutive frames then the new frame may be configured to reference (or reuse) the previous block and/or macroblock data that was unchanged instead of dedicating time and/or computational resources (e.g., CPU utilization, memory, etc.) to re-process the same block and/or macroblock data.

Another, additional or alternative, advantage of one or more approaches described herein is that such approaches may be used to improve video streaming technologies, such as video compression, encoding, and/or decoding technologies as described herein. In some examples, an encoder device (e.g., a streaming server, etc.) may utilize one or more GPU tile based framebuffer compression formats for encoding GUI frame data. In such examples, the GPU tile based framebuffer compression format may be specific to the GPU of the local streaming device (e.g., client device, etc.) which can allow the local streaming device to natively (or directly) render the data in the GPU tile based framebuffer compression format without dedicating time and/or computational resources (e.g., CPU utilization, memory, etc.) to decompressing (or reconstructing) the data. Additionally or alternatively, the local streaming device can decode any blocks and/or macroblocks in the GPU tile based framebuffer compression format using the GPU which reduces the burned on the CPU to decode other video streams (e.g., RGB channel data, a local video in 4K HDR, etc.). In some examples, a streaming server may be equipped with a plurality of codecs, such as H.264, H265, and/or GPU specific framebuffer compression/decompression software in order to accommodate GPU decoding techniques (as described herein) for various streaming devices and/or GPU models. For example, a streaming server may be configured for video encoding and/or in-line lossless framebuffer compression/decompression for ARM and/or Imagination brand GPUs.

Moreover, it should be appreciated that such examples as set forth herein solve particular technical problems, such as those identified and described above for traditional streaming systems and/or traditional streaming techniques. It will be appreciated that the scope of the present disclosure encompasses many potential example embodiments in addition to those described above, some of which will be described in further detail below.

Now that some advantages associated with various systems and processes described herein have been described above in contrast with traditional systems and techniques, examples of the architecture and componentry of example systems for encoding and decoding data will now be described below with reference to FIG. 1.

FIG. 1 illustrates example systems for encoding and decoding data, in accordance with various aspects of the present disclosure. As shown, the system 100 may comprise an encoder device 102, a decoder device 112, and a communications network 110. As shown, the encoder device 102 and the decoder device 112 may be communicatively coupled through the communications network 110 in order to exchange data with each other and/or any other electronic devices described herein. For example, the encoder device 102 may be embodied as a streaming server that may be in communication with a plurality of streaming devices (e.g., streaming sticks, smart televisions, etc.) in order to stream (or transmit), at least in part, video content to each of the plurality of streaming devices. Additionally or alternatively, the decoder device 112 may be embodied as a streaming stick that may be in communication with a plurality of streaming servers (e.g., each server associated with a respective streaming service and/or streaming application) in order to receive streaming content.

The encoder device 102, as shown, may be one or more of a server (e.g., streaming server, media server, web server, etc.), a computing device executing a soft codec (e.g., software code for encoding and/or decoding), a dedicated hardware codec (e.g., integrated circuit, SoC, and/or the like for encoding and/or decoding) of an electronic device, and/or any other examples of the electronic device 800 (and/or any combinations of components thereof) as described herein for, at least in part, encoding, compressing, and/or streaming video data. The encoder device 102, as shown, may comprise a parser 104, a first encoder 108A, a second encoder 108B, and/or the like as described herein. In some examples, encoder device 102 may further comprise one or more additional encoders each associated with a respective codec, such as H.264, H.265, a hardware (e.g., GPU, etc.) specific codec (or compression format), and/or any other codec as described herein. In some examples, the encoder device 102 may be configured to perform one or more solid color optimization operations as described below in connection with one or more flowcharts. For example, the encoder device 102, in some examples, may skip all pixel encoding and send full screen Alpha value updates in small (and/or periodic) Alpha updates (e.g., as reference blocks, macroblocks, and/or frames). In some examples, the encoder device 102 may support requests for full frame updates from one or more client devices (e.g., decoder device 112, etc.), such as based on client feedback. In some examples, the encoder device 102 may support sending partial frame updates that only transmit blocks (or macroblocks) that have changed since a last (or previous) frame. In some examples, the encoder device 102 may, at least in part, be hosted on a cloud streaming server. In some examples, the encoder device 102 may, at least in part, leverage a cloud streaming server to perform one or more software (and/or hardware) based encoding and/or compression operations as described herein.

The parser 104, as shown, may comprise one or more of a software program (e.g., parsing algorithm, segmentation algorithm, etc.), a dedicated hardware circuit (e.g., integrated circuit, SoC, and/or the like) of an electronic device, and/or the like as described herein for parsing and/or segmenting input data. For example, as shown, the encoder device 102 may use the parser 104 to divide, break, parse, and/or segment an RGBA bitstream (e.g., of the frame data 120) into an RGB channel (e.g., RGB data 122) and an Alpha channel (e.g., Alpha data 124).

The first encoder 108A, as shown, may comprise a video or non-video codec comprising a software and/or hardware based encoder. The first encoder 108A, as shown, may comprise H.264 (or Advanced Video Coding (AVC)), H.265 (or High Efficiency Video Coding (HEVC)), AV1 (or AOMedia Video 1), and/or the like, for encoding and/or compressing digital video data (e.g., a 4K movie, a GUI, etc.). For example, encoder device 102 may use the first encoder 108A to encode and/or compress a 4K movie and/or the RGB channel (e.g., RGB data 122) of a GUI frame (e.g., one or more of GUI frames 200 described in further detail below in connection with FIG. 2) in the H.264 format (or the like).

The second encoder 108B, as shown, may comprise a video or non-video codec comprising a software and/or hardware based encoder. The second encoder 108B, as shown, may comprise a video codec and/or compression format associated with a hardware component of the decoder device 112. For example, the second encoder 108B may be configured to encode and/or compress video data into a GPU tile based framebuffer compression format (or the like as described herein). In such examples, the GPU tile based framebuffer compression format may be associated with the GPU (and/or any other hardware) of a client device requesting the video data (e.g., decoder device 112). It will be understood that each GPU manufacturer may use a respective GPU tile based framebuffer compression format that is specific to that particular manufacturer and/or to a particular GPU (and/or any other hardware) model. For example, encoder device 102 may use the second encoder 108B to encode and/or compress the Alpha channel (e.g., Alpha data 124) of a GUI frame (e.g., one or more of GUI frames 200 described in further detail below in connection with FIG. 2) in a respective GPU tile based framebuffer compression format associated with the GPU model of the client device requesting the video data (e.g., decoder device 112). In some examples, the encoder device 102 may identify a GPU tile based framebuffer compression format, one or more hardware components (e.g., CPU, memory, GPU, manufacturer, brand, model, etc.), and/or the like for a decoder device 112 during performance of a communications protocol (e.g., TCP 3-Way Handshake Process and/or the like) between the encoder device 102 and decoder device 112.

Additionally or alternatively, the second encoder 108B, as shown, may comprise one or more of a software program, a dedicated hardware circuit (e.g., integrated circuit, SoC, and/or the like) of an electronic device, and/or the like as described herein for applying Alpha block and/or macroblock transforms (as described in further detail below in connection with at least FIGS. 7A-7B and 9). For example, the second encoder 108B may comprise an SoC, software and/or firmware configured to identify target values, pixels, blocks, and/or macroblocks within the Alpha channel (e.g., within the same frame, between two or more frames, etc.) and replace the target values, pixels, blocks and/or macroblocks with one or more transform blocks and/or macroblocks in order to reduce (or compress) frame data for transmission to a client device. In some examples, the second encoder 108B may be configured to apply one or more of the block raw transform, block encoded transform, macroblock raw transform, macroblock constant transform, block constant transform, coalesce last transform, coalesce current transform, and/or the like as described herein. In some examples, the second encoder 108B may be configured to generate one or more of a block raw transform block, block encoded transform block, macroblock raw transform block, macroblock constant transform block, block constant transform block, coalesce last transform block, coalesce current transform block, and/or the like as described herein. In some examples, the second encoder 108B may comprise one or more additional video codecs and/or additional encoders of the encoder device 102. In such examples, the decoder device 112 may comprise the same, or similar, video codec(s) and/or companion decoder(s) that may be compatible with the video codec(s) and/or encoder(s) of the encoder device 102. In some such examples, the decoder device 112 may read (or interpret) one or more transform blocks and/or macroblocks and reconstruct the frame data (e.g., frame data 120 or the like) based, at least in part, on the one or more transform blocks and/or macroblocks.

The communications network 110, as shown, may be the Internet, an intranet, and/or any other examples of a communications network as described herein for sending and/or receiving data between two or more electronic devices (e.g., encoder device 102, decoder device 112, electronic device 800, etc.). The communications network 110, as shown, may comprise one or more of a Wi-Fi circuit (e.g., Dual-band 802.11 a/b/g/n/ac/ax 2×2 MIMO dual-antenna, Tri-band 802.11 a/b/g/n/ac/ax 2×2 MIMO dual-antenna, etc.), ZigBee circuit, Bluetooth circuit (e.g., Bluetooth 5.2, Bluetooth Low Energy (BLE), etc.), LTE circuit, and/or any other communications protocol, hardware, software, and/or firmware. The communications network 110 may permit remote communication between two or more electronic devices, such as servers, computers, mobile devices (e.g., phones, television remotes, microphones, etc.), systems (e.g., cloud services, webservices, etc.), and/or the like as described herein. The communications network 110 may be representative of any type of communication network(s), data networks, voice network(s), and/or the like. The communications network 110 may be implemented using wired infrastructure (e.g., cable, CAT5, fiber optic cable, etc.), a wireless infrastructure (e.g., radio frequency, cellular, microwave, satellite, Wi-Fi, Bluetooth, etc.), one or more network devices (e.g., Wi-Fi routers, base stations, relay servers, etc.), and/or any other connection technologies. In some examples, the communications network 110 may comprise one or more communications channels, tunnels, Virtual Private Networks (VPNs), and/or the like. In some examples, the communications network 110 may be implemented using encryption techniques (e.g., end-to-end encryption, etc.).

The decoder device 112, as shown, may be one or more of a client device (e.g., streaming stick, smart television, smartphone, laptop, etc.), a computing device executing a soft codec (e.g., software code for encoding and/or decoding), a dedicated hardware codec (e.g., integrated circuit, SoC, and/or the like for encoding and/or decoding) of an electronic device, and/or any other examples of the electronic device 800 (and/or any combinations of components thereof) as described herein for, at least in part, decoding, decompressing, and/or rendering video data. The decoder device 112, as shown, may comprise a Central Processing Unit (CPU) 114, a Graphics Processing Unit (GPU) 116, a first decoder 118A, a second decoder 118B, multiplexer 134, and/or the like as described herein. In some examples, decoder device 112 may further comprise one or more additional decoders each associated with a respective codec, such as H.264, H.265, a hardware (e.g., GPU, etc.) specific codec (and/or compression format), and/or any other codec as described herein. In some examples, the decoder device 112 may further comprise a parser (e.g., parser 104 or the like) and/or any other software and/or hardware for dividing incoming data packets (e.g., data packet(s) 126 or the like) into an RGB channel (e.g., encoded RGB data 128) and/or an Alpha channel (e.g., encoded Alpha data 130). In some examples, the decoder device 112 may further comprise software and/or hardware for directing (or transmitting) RGB data (e.g., encoded RGB data 128) to the CPU 114 and/or for directing (or transmitting) Alpha data (e.g., encoded Alpha data 130) to the GPU 116, as shown. In some examples, the decoder device 112 may further comprise a software program, a dedicated hardware circuit (e.g., integrated circuit, SoC, and/or the like), and/or the like as described herein for processing Alpha block and/or macroblock transforms.

In some examples, the decoder device 112 may be configured to support full frame solid color optimization, full frame updates, and/or partial frame updates as described above in connection with the encoder device 102. In some examples, decoder device 112 may, at least in part, leverage a cloud streaming server, webservice, and/or the like to perform (or assist with) one or more software (and/or hardware) based decoding and/or decompression operations as described herein.

The CPU 114, as shown, may be a single core processor, a multiple core processor, and/or the like described herein. In some examples, the CPU 114 may comprise one or more cores of different types. For example, the CPU 114 may include one or more application processor units. In some examples, the CPU 114 may comprise a microcontroller, microprocessor, a digital signal processor, and/or any other processing units or components for performing data processing operations as described herein. In some examples, the CPU 114 may comprise, at least in part, the processor(s) 802 as described in further detail below in connection with FIG. 8. For instance, the CPU 114 may be the same as, or similar to, the processor(s) 802. In some examples, such as shown, the CPU 114 may comprise, at least in part, the first decoder 118A and/or any other decoder described herein. In other examples, the first decoder 118A may be a separate and distinct software and/or hardware component from the CPU 114.

The GPU 116, as shown, may be a multiple core processor, and/or the like described herein. In some examples, the GPU 116 may comprise a plurality of cores of different types. In some examples, the GPU 116 may comprise a microcontroller, microprocessor, a digital signal processor, and/or any other processing units or components for performing graphical data processing and/or rendering operations as described herein. In some examples, the GPU 116 may comprise, at least in part, the graphics circuit 808 and/or the GPU 810 as described in further detail below in connection with FIG. 8. For instance, the GPU 116 may be the same as, or similar to, the GPU 810. In some examples, the GPU 116 may comprise an IMG GE8300 or an IMG GE9215 by Imagination Technologies. In some examples, the GPU 116 may comprise a G52 MP2 or a G52 MP8 by ARM. It will be understood that the GPU 116 may comprise any other type, model, and/or family of GPU(s). In some examples, such as shown, the GPU 116 may comprise, at least in part, the second decoder 118B and/or any other decoder described herein. In other examples, the second decoder 118B may be a separate and distinct software and/or hardware component from the GPU 116.

The first decoder 118A, as shown, may comprise a video codec comprising a software and/or hardware based decoder. The first decoder 118A, as shown, may comprise H.264 (or Advanced Video Coding (AVC)), H.265 (or High Efficiency Video Coding (HEVC)), AV1 (or AOMedia Video 1), and/or the like, for decoding and/or decompressing digital video data (e.g., a 4K movie, a GUI, etc.). For example, decoder device 112 may use the first decoder 118A to decode and/or decompress a 4K movie and/or the RGB channel (e.g., RGB data 122) of a GUI frame (e.g., one or more of GUI frames 200 described in further detail below in connection with FIG. 2) in the H.264 format (or the like).

The second decoder 118B, as shown, may comprise a video codec comprising a software and/or hardware based decoder. The second decoder 118B, as shown, may comprise a video codec and/or compression format associated with a hardware component of the decoder device 112. For example, the second decoder 118B may be configured to decode and/or decompress video data from a GPU tile based framebuffer compression format (or the like as described herein). In such examples, the GPU tile based framebuffer compression format may be associated with the GPU (and/or any other hardware) of a client device requesting the video data (e.g., the GPU 116 of the decoder device 112). It will be understood that each GPU manufacturer may use a respective GPU tile based framebuffer compression format that is specific to that particular manufacturer and/or to a particular GPU (and/or any other hardware). For example, decoder device 112 may use the second decoder 118B to decode and/or decompress the Alpha channel (e.g., encoded Alpha data 130) of a GUI frame (e.g., one or more of GUI frames 200 described in further detail below in connection with FIG. 2) from a respective GPU tile based framebuffer compression format associated with the GPU 116. In some examples, the decoder device 112 may use the second decoder 118B to reconstruct one or more values, pixels, blocks, macroblocks (or tiles) and/or the like as described herein by applying one or more inverse transforms associated with a transform block and/or transform macroblock. In some examples, the decoder device 112 may (e.g., using the second decoder 118B, etc.) identify which inverse transform to apply to a transform block and/or transform macroblock based on the block header, macroblock header, and/or the like as described below in connection with FIGS. 7A-7B. In some examples, the decoder device 112 may identify the type, model, and/or family of the GPU 116 and/or the GPU tile based framebuffer compression format, and/or the like to the encoder device 102 during performance of a communications protocol (e.g., TCP 3-Way Handshake Process and/or the like) between the encoder device 102 and decoder device 112.

The multiplexer 134, as shown, may comprise a video (and/or GUI) multiplexer comprising a software and/or hardware based multiplexer and/or the like for mixing, merging and/or blending data. As shown in the depicted example, the multiplexer 134 may receive, at least in part, decoded (or unencoded) RGB data and decoded (or unencoded) Alpha data then the multiplexer may perform one or more mixing, merging, blending and/or multiplexing operations to combine the RGB data and the Alpha data and generate the output data 132. For example, as shown, the multiplexer 134 may receive decoded (or unencoded) RGB channel data from the decoder 118A and decoded (or unencoded) Alpha channel data from the decoder 118B. Additionally, the multiplexer 134 may combine (or recombine) the RGB channel with the Alpha channel to generate, at least in part, one or more video frames, GUI frames, and/or the like as described herein.

As shown in FIG. 1, the encoder device 102 may receive frame data 120, such as from a database, memory, a storage device, another electronic device (e.g., server, etc.). The frame data 120, as shown, may comprise an RGBA bitstream comprising an RGB channel and an Alpha channel. In some examples, the RGBA bitstream may be representative of a GUI comprising 1080p60 and/or any other resolution. In some such examples, the frames of the GUI may comprise 1920×1088 pixels divided, at least in part, into 16×16 pixel blocks. The frame data 120 may comprise one or more of GUI frames 200 described in further detail below in connection with FIG. 2. The frame data 120 may comprise one or more macroblocks (e.g., macroblock 302, tiles, etc.), blocks (e.g., block 304), and/or pixels (e.g., pixel 306), such as described in further detail below in connection with FIG. 3. The frame data 120 may comprise one or more framebuffers, such as framebuffer 400 described in further detail below in connection with FIG. 4. The frame data 120 may comprise one or more block buffers, such as block buffer 500 described in further detail below in connection with FIG. 5.

The encoder device 102, as shown, may use the parser 104 to divide the frame data 120, at least in part, into the RGB data 122 comprising an RGB channel and/or the Alpha data 124 comprising an Alpha channel. The encoder device 102, as shown, may use software and/or hardware to identify and/or direct the RGB data 122 for processing with the first encoder 108A. For example, the RGB data 122 may be encoded using an H.264 codec. The encoder device 102, as shown, may further use software and/or hardware to identify and/or direct the Alpha data 124 for processing with the second encoder 108B. For example, the Alpha data 124 may be processed by the second encoder 108B (as described in further detail below in connection with at least FIGS. 7A-7B and 9), such as to reduce duplicate (or redundant) block and/or macroblock data. In such examples, the Alpha data 124 and/or any transform blocks generated by the second encoder 108B may be processed by the second encoder 108B. For instance, the Alpha data 124 and/or any transform blocks generated by the second encoder 108B may be converted to a GPU tile based framebuffer compression formats (e.g., associated with the GPU 114 of the decoder device 112). In some examples, the Alpha data 124 may bypass the second encoder 108B and proceed directly to the second encoder 108B (as indicted by the dashed arrow between the Alpha data 124 and the second encoder 108B). In some examples, the Alpha data 124 may not be processed by an encoder (e.g., second encoder 108B). In some such examples, the Alpha data 124 may be transformed, at least in part, using the second encoder 108B and/or the Alpha data 124 may comprise one or more of a raw block buffer and/or a raw macroblock buffer (as described below in connection with block raw header 702 and/or macroblock raw header 706 of FIG. 7A).

The encoder device 102, as shown, may package the RGB data 122 and/or the Alpha data 124 into one or more containers and/or data packets (e.g., data packet(s) 126), such as after processing with first encoder 108A, second encoder 108B, and/or the like as described herein. The encoder device 102, as shown, may transmit the data packet(s) 126, using the communications network 110, to decoder device 112. In such examples, the encoder device 102 and the decoder device 112 may establish one or more communication channels using the communications network 110 to exchange data (e.g., the data packet(s) 126, GPU and/or other hardware information, device identifiers, user/account credentials, etc.).

As shown in FIG. 1, the decoder device 112 may receive the data packet(s) 126, via the communications network 110, from the encoder device 102. The data packet(s) 126 may comprise the encoded RGB data 128 and the encoded Alpha data 130. The decoder device 112, as shown, may unpackage the data packet(s) 126 and direct the RGB data 128 to the first decoder 118A, for example, for processing with the CPU 114. For example, the CPU 114, using (or leveraging) the first decoder 118A, may decode and/or decompress the encoded RGB data 128 and, at least in part, reconstruct the RGB data 122 at the decoder device 112. Additionally or alternatively, the decoder device 112, as shown, may unpackage the data packet(s) 126 and direct the Alpha data 130 to the second decoder 118B for processing with the GPU 116. The GPU 116, using the second decoder 118B, may decode and/or decompress the encoded Alpha data 130 and, at least in part, reconstruct the Alpha data 124 at the decoder device 112. In some examples, the GPU 116 may not decode and/or decompress the encoded Alpha data 130 and may process the encoded Alpha data 130 in a native GPU tile based framebuffer compression format. In some examples, the CPU 114, the GPU 116, and/or the multiplexer 134 may reconstruct the frame data 120 (at the decoder device 112) using one or more of the encoded RGB data 128, the encoded Alpha data 130, and/or any transform blocks (and/or block header information as described herein). For example, as shown the multiplexer 134 may receive RGB channel data from the decoder 118A (and/or CPU 114) and Alpha channel data from the decoder 118B (and/or the GPU 116), then the multiplexer 134 (and/or the CPU 114, the GPU 116, etc.) may combine (or recombine) the RGB channel data with the Alpha channel to generate, at least in part, the output data 132. In some such examples, such as shown, the decoder device 112 (using the CPU 114 and/or the GPU 116) may generate output data 132 comprising, at least in part, the frame data 120 (and/or any frame(s) as described herein). In such examples, the decoder device 112 may transmit the output data 132 to a display or screen of another electronic device for rendering. For example, the decoder device 112 may be a streaming stick and may transmit the output data 132 to a television for rendering on a television screen. In other examples, the decoder device 112 may render the output data 132 on a display or screen of the decoder device 112. For example, the decoder device 112 may be a smartphone, or smart television, and may render the output data 132 on an internal display or screen.

Now that examples of the architecture and componentry of example systems for encoding and decoding data have been described above with reference to at least FIG. 1, example frames of an example GUI will now be described below with reference to FIG. 2.

Figure 2:
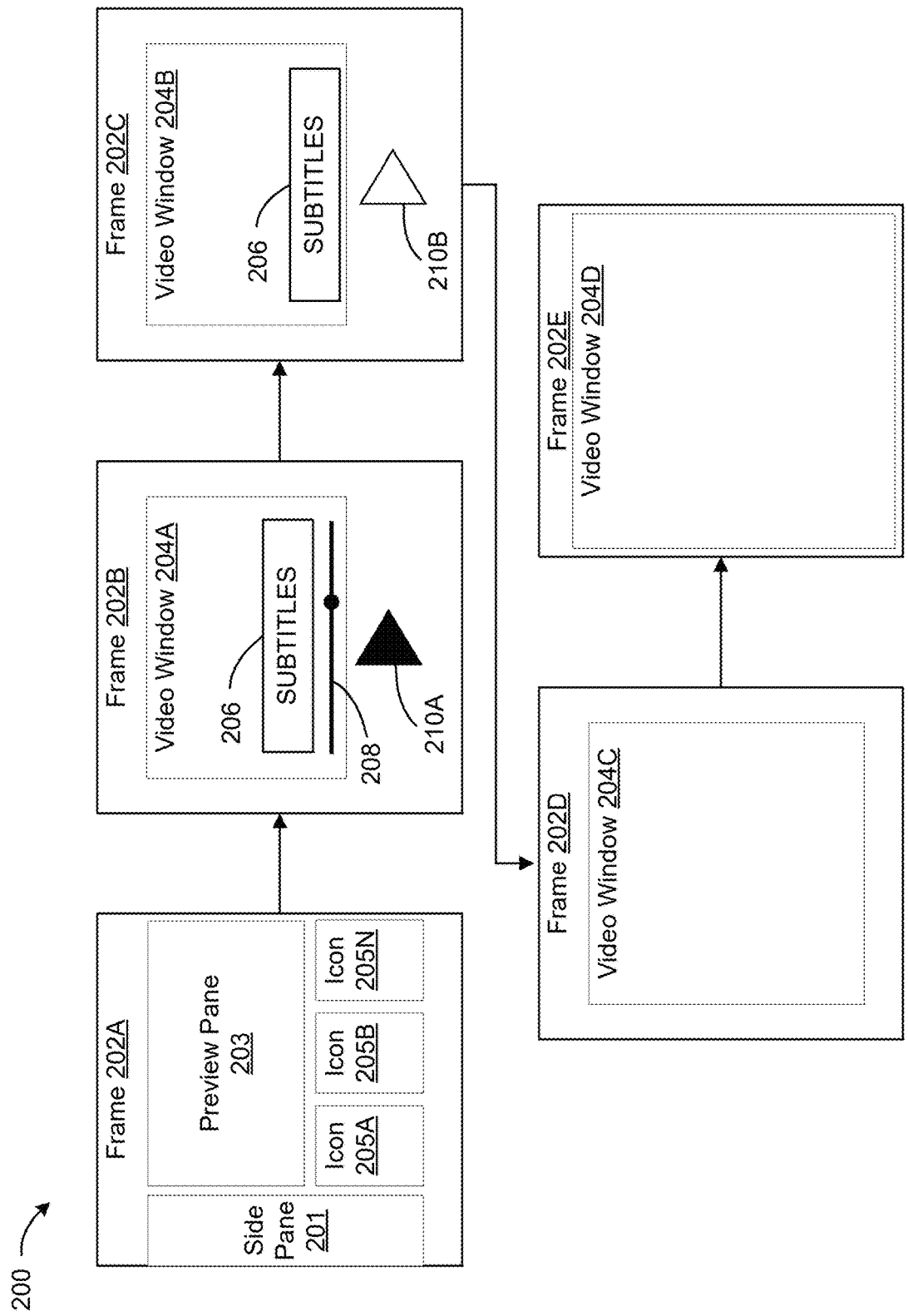
FIG. 2 illustrates example frames of an example GUI, in accordance with various aspects of the present disclosure.

FIG. 2 illustrates example frames of an example GUI, in accordance with various aspects of the present disclosure. As shown, the GUI frames 200 may comprise a video selection frame 202A, a video settings frame 202B, a partially transparent frame 202C, a transparent windowed frame 202D, a transparent expanded frame 202E, and/or the like as described herein.

The video selection frame 202A, as shown, may be a home screen for a streaming application, a landing page for a website, and/or any other screen for navigating and/or selecting streaming content as described herein. For example, the video selection frame 202A may represent a home screen for a streaming application (e.g., Amazon Prime Video). In such examples, a user may scroll through various video titles (e.g., by scrolling through icons 205A-205N). The video selection frame 202A, as shown, may comprise a plurality of graphical interface elements including, without limitation, a side pane 201, a preview pane 203, and a plurality of icons (e.g., icons 205A-205N). In some examples, as the user scrolls through icons 205A-205N the previous pane 203 may display information and/or images (e.g., movie posters, movie trailers, etc.) to the user that corresponds to the selected icon (e.g., any of icons 205A-205N). In some examples, the side pane 201 may comprise a plurality of additional graphical interface elements, such as a search icon, categories icons (e.g., movies, television shows, recommended titles, etc.), an applications settings icon, and/or the like. In some examples, the graphical interface elements may further comprise any other graphical interface elements as described herein. The graphical interface elements of the video selection frame 202A, as shown, may be solid (or non-transparent). For example, the pixels, blocks, and/or macroblocks comprising the video selection frame 202A may be assigned an Alpha channel value of 1 indicating that the pixels are fully opaque (or non-transparent).

After selecting a video, such as by selecting an icon (e.g., any of icons 205A-205N), the video selection frame 202A may transition to the video settings frame 202B to start playing the associated video. The video settings frame 202B, as shown, may comprise a video window 204A, a subtitle section 206, a progress bar 208, and a play button 210A. In some examples, the video selection frame 202A may comprise a plurality of additional graphical interface elements, such as a pause icon, skip icons (e.g., to skip 30 seconds forward or backwards), a rewind icon, a fast-forward icon, a closed captions icon, and/or any other graphical interface elements as described herein. As shown, the pixels, blocks, and/or macroblocks comprising the video window 204A may be assigned an Alpha channel value of 0 indicating that the pixels are fully transparent (or non-opaque). It will be understood that the video window 204A is part of the GUI and a streaming video (e.g., 4K movie) may be played behind (or on a layer below) the GUI. Further, it should be appreciated that the video window 204A is fully transparent so that the streaming video is visible to a user through the GUI. The subtitle section 206 and/or the progress bar 208, as shown, may be disposed over the video window 204A. In some examples, the regions of the GUI outside of the video window 204A may be at least partially opaque. As shown, the pixels, blocks, and/or macroblocks comprising the subtitle section 206, the progress bar 208, and the play button 210A may be assigned an Alpha channel value of 1 indicating that the pixels are fully opaque (or non-transparent). In some examples, the pixels, blocks, and/or macroblocks comprising the subtitle section 206 and/or the progress bar 208 may be assigned an Alpha channel value greater than 0 and less than 1 indicating that the pixels may be partially opaque or partially transparent. For example, the progress bar 208 may fade from fully opaque to fully transparent, by transitioning through one or more partially opaque (or partially transparent) states, after a user does not interact (e.g., click on an icon, move a mouse over the GUI, etc.) with the GUI for a predefined amount of time (e.g., 5 seconds, 1 minute, or any other time interval). In some examples, the user may turn on subtitles which will cause the subtitles section 206 to become fully opaque. In other examples, the user may turn off subtitles which will cause the subtitles section 206 to become fully transparent.

After playing a video for a predefined amount of time and/or after a user does not interact with the GUI for a predefined amount of time, the video settings frame 202B may transition the partially transparent frame 202C. In some examples, if the user interacts with the GUI during a video the partially transparent frame 202C (or any other frame described below) may transition back to the video settings frame 202B. The partially transparent frame 202C, as shown, may be a transition frame between the video settings frame 202B and the transparent windowed frame 202D. The partially transparent frame 202C, as shown, may comprise a video window 204B, a subtitle section 206, and a play button 210B. In some examples, the partially transparent frame 202C may comprise a plurality of additional graphical interface elements, such as a pause icon and/or the like described herein. As shown, the progress bar 208 of the video settings frame 202B may fade to fully transparent in the partially transparent frame 202C. Additionally or alternatively, the play button 210A (e.g., associated with an Alpha value of 1) of the video settings frame 202B may fade to play button 210B (e.g., associated with an Alpha value of less than 1) in the partially transparent frame 202C. In some examples, the regions of the GUI outside of the video window 204B may be at least partially opaque.

After a predefined amount of time and/or after a user does not interact with the GUI for a predefined amount of time, the partially transparent frame 202C may transition the transparent windowed frame 202D. In some examples, the GUI may transition to the transparent windowed frame 202D directly from the video settings frame 202B. The transparent windowed frame 202D, as shown, may be a transition frame between the partially transparent frame 202C and the transparent expanded frame 202E. The transparent windowed frame 202D, as shown, may comprise a video window 204C. In some examples, the transparent windowed frame 202D may comprise a plurality of additional graphical interface elements, such as a pause icon and/or the like described herein. It will be understood that additional graphical interface elements may be present and/or fully transparent in the GUI represented in the transparent windowed frame 202D. As shown, the video window 204B of the partially transparent frame 202C may expand in size to fill more of the transparent windowed frame 202D (e.g., in order to cover more of the display (or screen) of a television or other electronic device) as shown by the video window 204C in the transparent windowed frame 202D. In some examples, the regions of the GUI outside of the video window 204C may be at least partially opaque.

After a predefined amount of time and/or after a user does not interact with the GUI for a predefined amount of time, the transparent windowed frame 202D may transition to the transparent expanded frame 202E. In some examples, the GUI may transition to the transparent expanded frame 202E directly from the video settings frame 202B. The f transparent expanded frame 202E, as shown, may be a video viewing frame for viewing a video without graphical interface elements covering the video. In some examples, the transparent expanded frame 202E may comprise a subtitles section (e.g., subtitles section 206) which may partially overlap with a video. The transparent expanded frame 202E, as shown, may comprise a video window 204D. In some examples, the entire GUI (e.g., all GUI macroblocks, blocks, pixels) of the transparent expanded frame 202E may be associated with an Alpha value of 0. In other examples, at least a portion of the GUI may be non-transparent, such as when cinematic bars are added to the top and bottom of the frame. As shown, the video window 204C of the transparent windowed frame 202D may expand in size to fill more of the transparent expanded frame 202E (e.g., in order to cover all of the display (or screen) of a television or other electronic device) as shown by the video window 204D in the transparent expanded frame 202E. In some examples, any regions of the GUI remaining outside of the video window 204D (e.g., cinematic bars, etc.) may be at least partially opaque.

It should be appreciated that the GUI frames 200 as illustrated in FIG. 2 depicted various examples of Alpha channel use cases for an RGBA GUI. In some examples, a video window (e.g., video windows 204A-204D) may comprise a rectangular cutout within one or more of a GUI frame, macroblock, and/or block for one or more video underlays to show through. In some examples, a video window (e.g., video windows 204A-204D) may comprise a rectangular cutout within one or more of a GUI frame, macroblock, and/or block for one or more video underlays to show through with an Alpha gradient along at least one side of the cutout (e.g., a trailer playing in the preview pane 203 with an Alpha gradient fading the side pane 201 into the preview pane 203 on the left-hand side of the preview pane 203). In some examples, a full screen video (e.g., video windows 204D) may be partially covered by Alpha blended subtitles (e.g., subtitles section 206 or the like). In such examples, the Alpha blended subtitles may have an Alpha value greater than 0 and less than 1. In some examples, a GUI may fade in and/or out over a full screen video (e.g., as shown by the transition, at least in part, between any or all of the GUI frames 200).

Now that example frames of an example GUI have been described above with reference to FIG. 2, an example frame comprising macroblocks, blocks, and pixels will now be described below with further reference to FIG. 3.

Figure 3:
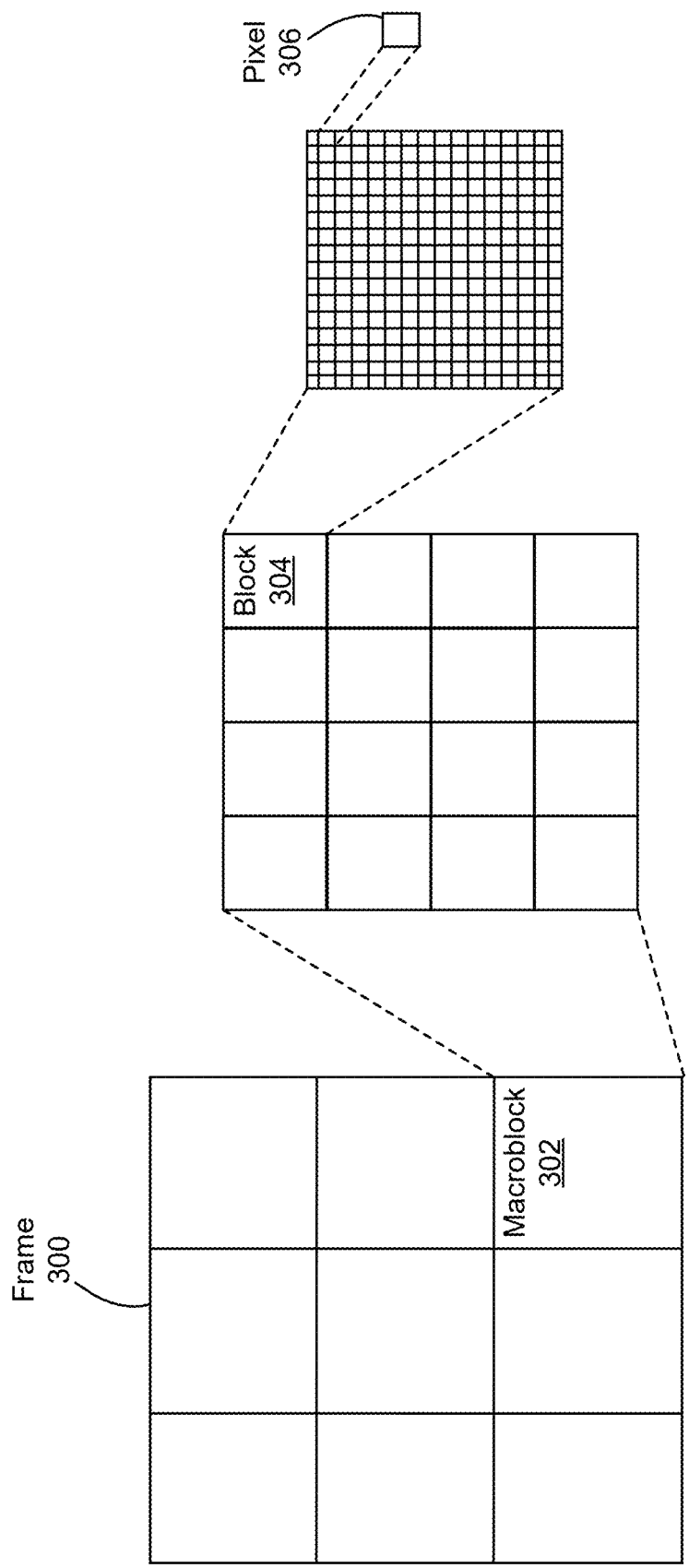
FIG. 3 illustrates an example frame comprising macroblocks, blocks, and pixels, in accordance with various aspects of the present disclosure.

FIG. 3 illustrates an example frame comprising macroblocks, blocks, and pixels, in accordance with various aspects of the present disclosure. As shown, the frame 300 may be a video and/or GUI frame. For example, any or all of GUI frame 200 described above in connection with FIG. 2 may comprise the frame 300 as described herein. The frame 300, as shown, may comprise one or more of a macroblock 302, a block 304, a pixel 306, and/or the like as described herein.

The frame 300, as shown, may comprise a plurality of macroblocks including macroblock 302. In some examples, macroblock 302 may be a tile, such as a tile of a GUI (e.g., GUI tile, etc.). The frame 300, as shown, comprises 9-macroblocks, this is done for illustrative purposes and to facilitate clearer description of the examples described herein. It will be understood that the frame 300 and/or any other video and/or GUI frame described herein may comprise any number of macroblocks. In some examples, a frame may comprise 510-macroblocks. In other examples, a frame may comprise another number of macroblocks. In some examples, the resolution of a macroblock may be a function of the resolution of a frame. For example, if the frame 300 comprises a resolution of 1920×1088 pixels then the macroblock 302 (or tile) may comprise a resolution of 64×64 pixels. Additionally or alternatively, if the frame 300 comprises a resolution of 3820×2160 pixels then the macroblock 302 (or tile) may comprise a resolution of 128×128 pixels. In other examples, the frame 300 and/or the macroblock 302 (or tile) may each comprise another respective resolution. In some examples, a frame (e.g., frame 300, GUI frames 200, and/or the like described herein) may further comprise a framebuffer, such as framebuffer 400 described in further detail below in connection with FIG. 4. In some examples, a frame (e.g., frame 300, GUI frames 200, and/or the like described herein) may further comprise a block buffer, such as block buffer 500 described in further detail below in connection with FIG. 5. In some examples, a frame (e.g., frame 300, GUI frames 200, and/or the like described herein) may further comprise a frame header, such as frame header 600 described in further detail below in connection with FIG. 6.

The macroblock 302 (or tile), as shown, may comprise a plurality of blocks including block 304. The macroblock 302 (or tile), as shown, comprises 16-blocks, this is done for illustrative purposes and to facilitate clearer description of the examples described herein. It will be understood that the macroblock 302 (or tile) and/or any other video and/or GUI macroblock described herein may comprise any number of blocks. In some examples, a macroblock may comprise 64-blocks. In other examples, a macroblock may comprise another number of blocks. In some examples, the frame 300 may comprise 8160-blocks. In other examples, a frame may comprise another number of blocks. In some examples, the resolution of a block may be a function of the resolution of a frame and/or the resolution of a macroblock. In other examples, the resolution of a block may be a fixed number (e.g., any or all blocks, including block 304, may be 16×16 pixels). In some examples, the macroblock 302 (or tile) (and/or the like) may comprise RGB and/or Alpha channel information for any or all pixels contained within the macroblock 302 (e.g., tile, and/or the like). In some examples, a macroblock may contain a reference value (e.g., an Alpha value, RGB values, etc.) to apply to all pixels and/or blocks contained within that specific macroblock. For example, one or more macroblocks making up a pane (e.g., preview pane 203, video windows 204A-204D, and/or the like described herein) may contain an Alpha value (or reference value) of 0 for all pixels within the one or more macroblocks in order to produce a fully transparent pane within a GUI. In other examples, a macroblock may contain a respective value (e.g., a respective Alpha value, respective RGB values, etc.) for each respective pixel and/or block contained within that specific macroblock. For example, one or more macroblocks making up a preview pane (e.g., preview pane 203 or the like as described herein) may contain various respective Alpha values (e.g., 0, 1, and/or values greater than 0 and less than 1) for all pixels and/or blocks within the one or more macroblocks in order to produce an Alpha gradient along at least one side of the preview pane (or cutout). In some examples, the macroblock 302 (or tile) may comprise only Alpha channel or only RGB channel data. In such examples, RGB data (e.g., RGB data 122) may comprise a first macroblock (e.g., comprising RGB values) for a portion of the GUI and the Alpha data (e.g., Alpha data 124) may comprise a second macroblock (e.g., comprising Alpha values) for the same portion of the GUI. In some examples, a macroblock (e.g., macroblock 302, tile, and/or the like described herein) may further comprise a macro block buffer. In some examples, a macroblock (e.g., macroblock 302, tile, and/or the like described herein) may further comprise a macroblock header, such as macroblock raw header 706, macroblock constant header 708, and/or the like as described in further detail below in connection with FIGS. 7A-7B.

The block 304, as shown, may comprise a plurality of pixels (e.g., pixel 306). The block 304, as shown, comprises 16×16 pixels, this is done for illustrative purposes and to facilitate clearer description of the examples described herein. It will be understood that the block 304 and/or any other video and/or GUI block described herein may comprise any number of pixels. For example, the block 304 may comprise 256-pixels. In other examples, a block may comprise another number of pixels. In some examples, the block 304 (and/or the like) may comprise RGB and/or Alpha channel information for any or all pixels contained within the block 304 (and/or the like). In some examples, a block may contain a reference value (e.g., an Alpha value, RGB values, etc.) to apply to all pixels contained within that specific block. For example, one or more blocks making up a video window (e.g., any or all of video windows 204A-204D) may contain an Alpha value (or reference value) of 0 for all pixels within the one or more blocks in order to produce a fully transparent video window. In other examples, a block may contain a respective value (e.g., a respective Alpha value, respective RGB values, etc.) for each respective pixel contained within that specific block. For example, one or more blocks making up a subtitle section (e.g., subtitle section 206 or the like as described herein) may contain various respective Alpha values (e.g., 0, 1, and/or values greater than 0 and less than 1) for the pixels contained within the one or more blocks in order to produce Alpha blended subtitles. In some examples, the block 304 may comprise only Alpha channel or only RGB channel data. In such examples, RGB data (e.g., RGB data 122) may comprise a first block (e.g., comprising RGB values) for a portion of the GUI and the Alpha data (e.g., Alpha data 124) may comprise a second block (e.g., comprising Alpha values) for the same portion of the GUI. In some examples, a block (e.g., block 304 and/or the like described herein) may further comprise a block buffer, such as described in further detail below in connection with FIG. 5. In some examples, a block (e.g., block 304 and/or the like described herein) may further comprise a block header, such as block raw header 702, block encoded header 704, block constant header 710, and/or the like as described in further detail below in connection with FIGS. 7A-7B.

Now that an example frame comprising macroblocks, blocks, and pixels has been described above with reference to FIG. 3, an example framebuffer will now be described below with reference to FIG. 4.

Figure 4:
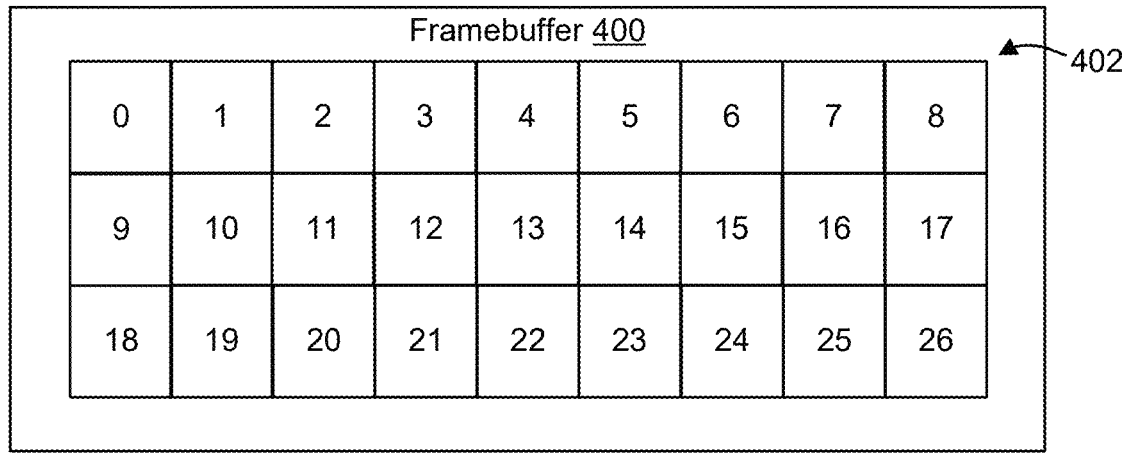
FIG. 4 illustrates an example framebuffer, in accordance with various aspects of the present disclosure.

FIG. 4 illustrates an example framebuffer, in accordance with various aspects of the present disclosure. As shown, the framebuffer 400 may be a video and/or GUI framebuffer. The framebuffer 400, as shown, may be a rasterized representation of a frame (e.g., frame 300, GUI frames 200, etc.). In some examples, the framebuffer 400 may comprise RGB and/or Alpha data. The framebuffer 400, as shown, may comprise a plurality of indices 402 (e.g., index 0-26). The framebuffer 400 may further comprise a portion of memory (e.g., Random-Access Memory (RAM), memory 804, etc.) that contains a bitmap representing all the pixels in a full (or complete) video and/or GUI frame (e.g., frame 300, GUI frames 200, etc.). In such examples, the framebuffer 400 may be a memory buffer that holds data (e.g., RGB data, Alpha data, etc.) for rendering a video and/or GUI on a display (e.g., television screen, computer monitor, etc.). As shown in FIG. 4, each index (e.g., 0-26, or any other numbered index) represents a pixel in a row from left to right and row after row within a frame. The framebuffer 400, as shown, starts at the upper lefthand corner with index 0. The first row of indices is from 0-8, the second row is below the first row and includes indices 9-17, and the third is below the second row and includes indices 18-26. In some examples, the framebuffer 400 (or the like) may comprise any number of rows and each row may contain any number of indices. In some examples, an index of a framebuffer (e.g., framebuffer 400) may comprise one or more of a red intensity value, a green intensity value, a blue intensity value, an Alpha value, a reference value, and/or any other data for rendering a pixel on a display as described herein. In some examples, a framebuffer (e.g., framebuffer 400 and/or the like described herein) may further comprise, or be associated with, a frame header, such as frame header 600 described in further detail below in connection with FIG. 6.

Now that an example framebuffer has been described above with reference to FIG. 4, an example block buffer will now be described below with reference to FIG. 5.

Figure 5:
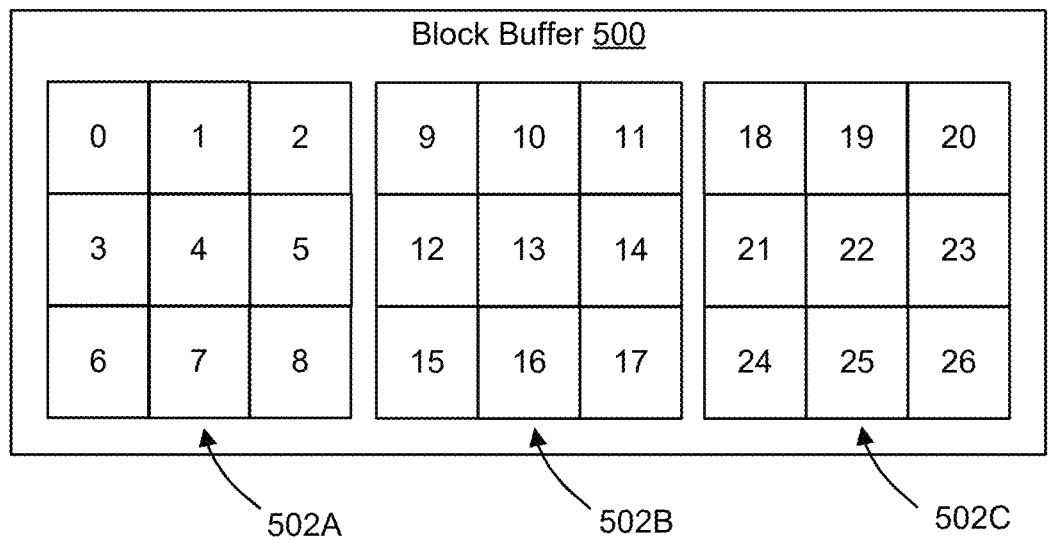
FIG. 5 illustrates an example block buffer, in accordance with various aspects of the present disclosure.

FIG. 5 illustrates an example block buffer, in accordance with various aspects of the present disclosure. As shown, the block buffer 500 may be a video and/or GUI block buffer. may be a video and/or GUI framebuffer. The block buffer 500, as shown, may be a rasterized and/or block representation of a frame (e.g., frame 300, GUI frames 200, etc.). In some examples, the block buffer 500 may comprise RGB and/or Alpha data. The block buffer 500, as shown, may comprise a plurality of indices (e.g., indices 502A-502C). The block buffer 500 may further comprise a portion of memory (e.g., Random-Access Memory (RAM), memory 804, etc.) that contains a bitmap representing all the pixels in a full (or complete) video and/or GUI frame (e.g., frame 300, GUI frames 200, etc.) grouped and/or organized into macroblocks and/or blocks, as shown. In some examples, the block buffer 500 may be a memory buffer that holds data (e.g., RGB data, Alpha data, etc.) for rendering a video and/or GUI on a display (e.g., television screen, computer monitor, etc.). As shown in FIG. 5, (in contrast to the framebuffer 400 which lays out a frame in rows as described above and illustrated in FIG. 4), the block buffer 500 may lay out rows of blocks and/or macroblocks, as shown. In the depicted example, indices 502A (e.g., 0-8) may represent a first block and/or macroblock of a first row of blocks and/or macroblocks. The indices 502B (e.g., 9-17) may represent a second block and/or macroblock of the first row of blocks and/or macroblocks. The indices 502C (e.g., 18-26) may represent a third block and/or macroblock of the first row of blocks and/or macroblocks. In some examples, the block buffer 500 (or the like) may comprise any number of rows of blocks and/or macroblocks and each row may contain any number of indices, blocks, and/or macroblocks. In some examples, an index of a block buffer (e.g., block buffer 500) may comprise one or more of a red intensity value, a green intensity value, a blue intensity value, an Alpha value, a reference value, and/or any other data for rendering a pixel on a display as described herein. In some examples, a block buffer (e.g., block buffer 500 and/or the like described herein) and/or one or more indices (e.g., indices 502A-502C and/or the like described herein) may further comprise, or be associated with, a block and/or macroblock header, such as block raw header 702, block encoded header 704, block constant header 710, macroblock raw header 706, macroblock constant header 708, and/or the like as described in further detail below in connection with FIGS. 7A-7B.

Now that an example block buffer has been described above with reference to FIG. 5, an example frame header will now be described below with reference to FIG. 6.

FIG. 6 illustrates an example frame header, in accordance with various aspects of the present disclosure. As shown, the frame header 600 may be a video and/or GUI frame header. The frame header 600, as shown, may comprise a frame type, a frame length, and/or any other frame information as described herein. Example frame lengths may include, without limitation, a number of bits, pixels, blocks, macroblocks, and/or the like as described herein. For example, a raw frame may comprise a fixed length frame (e.g., 1920×1088, etc.) and/or a raw block buffer. Additionally or alternatively, a transform frame may comprise a variable length frame and/or a sequential list of block transforms (e.g., as described in further detail below in connection with at least FIGS. 7A-7B and 9).

Example frame types may include, without limitation, a raw frame type, a transform frame type, a video type, a GUI type, a reference type, an I-frame type, a P-frame type, a B-frame type, and/or any other frame type as described herein. In some examples, an I-frame may be an intraframe comprising all information necessary to render the entire frame of a video and/or GUI (e.g., without reference to another frame). In some examples, a P-frame may be a predicted frame comprising, at least in part, information necessary to render the frame of a video and/or GUI and reference information indicating, at least in part, another frame (e.g., a previous I-frame and/or P-frame). In such examples, a P-frame may reference a previous frame that does not directly precede the P-frame (e.g., a P-frame may be a fifth frame in a series of frames and the P-frame may reference a first frame in the series of frames). In some examples, a B-frame may be a bidirectionally predicted frame comprising, at least in part, information necessary to render the frame of a video and/or GUI and reference information indicating, at least in part, another frame (e.g., a surrounding I-frame and/or P-frame, a previous frame, a following frame, etc.).

The frame header 600, as shown, may further comprise any additional information associated with the video frame represented by the frame header 600. For example, the frame header 600 may further comprise a binary pixel representation (e.g., in an ArrayBuffer, TypedArray, etc.), a video frame format (e.g., pixel format of the frame), dimensions of the frame, timing information, color space of the frame (e.g., RGBA, etc.), video codec information (e.g., H.264, GPU tile based framebuffer compression format, and/or the like as described herein), bitstream information (e.g., electronic device information for an encoder and/or decoder as described herein), error recovery information, reference values, encryption and/or decryption information (e.g., keys, etc.), and/or any other frame, block, and/or macroblock information as described herein. In some examples, the frame header 600 may not comprise additional information beyond the frame type and/or frame length.

Now that an example frame header has been described above with reference to FIG. 6, example headers associated with various block transforms will now be described in further detail below with reference to FIGS. 7A and 7B.

FIGS. 7A and 7B illustrate example headers associated with various block transforms, in accordance with various aspects of the present disclosure. As shown, a header of the headers 700 may be one or more of a video frame header, a GUI frame header, a block header, and/or a macroblock header. The headers 700, as shown, may comprise a block raw header 702, block encoded header 704, macroblock raw header 706, macroblock constant header 708, block constant header 710, coalesce last header 712, coalesce current header 714, and/or the like as described herein. In some examples, a header of headers 700 as described herein may comprise, at least in part, another header of headers 700.

As shown in FIGS. 7A and 7B, a header of the headers 700 may comprise one or more of a Tform type or transform type, a unique block ID or identifier, a length (or dimensions), a raw block buffer, an encoded block buffer, a raw macroblock buffer, an encoded macroblock buffer, a constant value (or reference value), a reference block ID or identifier, and/or the like as described herein.

The Tform type (or transform type), as shown, may represent a type of Alpha block transform applied to the frame, macroblock, and/or block that is associated with a header of the headers 700. Example Tform types may indicate, without limitation, a block type, a macroblock type, a constant value type, a raw buffer type, an encoded buffer type, a last or previous reference type, a current reference type, a coalesce type, and/or as other transform type as described herein. In some examples, block transforms may be applied and/or processed in the order they appear and/or are identified. In such examples, this allows multiple transforms to be applied to the same block and/or macroblock. In some such examples, a header of the headers 700 may comprise a plurality of Tform types within the header of the block and/or macroblock in the order in which each transform was applied and/or processed. In some examples, all unique transforms may be defined (e.g., in the frame header 600, in memory, etc.) in a transforms list and each unique block identifier may be listed under each applicable transform. In some examples, each block and/or macroblock header may indicate a Tform type and each frame header (or the like) may indicate a transforms list with each unique block identifier applicable to a respective transform of the transforms list.

The unique block ID (or identifier), as shown, may be one or more of a number, alpha value, alpha-numeric value, and/or any other identifier for uniquely identifying each block and/or macroblock within a dataset (e.g., frame, set of frames, video, GUI, etc.). In some examples, one or more unique block IDs may be used to specify a particular block and/or macroblock. In some examples, if a unique block ID is not present in a transform and/or a header, that unidentified block and/or macroblock may automatically default to using the cached pixel values for a previous block and/or macroblock from the previous frame. For example, a previous block and/or macroblock may share a location (or coordinate) within the previous frame that matches a location (or coordinate) of the unidentified block and/or macroblock in the current frame. It should be appreciated that because Alpha values change infrequently this technique may be used frequently to reduce the number of blocks that need to be transmitted between an encoder device (e.g., encoder device 102) and a decoder device (e.g., decoder device 112).

The length (or dimensions), as shown, may represent one or more of a size, length, and/or dimension of a block and/or macroblock. Example lengths (or dimensions) may include, without limitation, a number of bits, bytes, pixels, and/or any other unit of measure for a block and/or macroblock. For example, a length may represent a length of a buffer (e.g., block buffer 500 as described above in connection with FIG.

5), such as 256-bytes for 16-byte block lengths. In other examples, the length (or dimensions) may be any other number and/or unit(s).

The raw block buffer, as shown, may comprise a raw and/or unencoded block and/or block buffer, such as block buffer 500 as described above in connection with FIG. 5. In some examples, a raw block buffer may comprise one or more indices (e.g., indices 502A-502C).

The encoded block buffer, as shown, may comprise an encoded block and/or block buffer, such as block buffer 500 as described above in connection with FIG. 5. In some examples, an encoded block buffer may comprise one or more indices (e.g., indices 502A-502C).

The raw macroblock buffer, as shown, may comprise a raw and/or unencoded macroblock and/or macroblock buffer, such as block buffer 500 as described above in connection with FIG. 5. In some examples, a raw macroblock buffer may comprise one or more indices (e.g., indices 502A-502C).

The encoded macroblock buffer, as shown, may comprise a transform and/or encoded macroblock and/or macroblock buffer, such as block buffer 500 as described above in connection with FIG. 5. In some examples, an encoded macroblock buffer may comprise one or more indices (e.g., indices 502A-502C).

The constant value (or reference value), as shown, may be a single value that is appliable to all pixels within a block and/or macroblock. For example, a block within a video window (e.g., video window 204A or the like as described above in connection with FIG. 2) may have a constant Alpha value of 0 for all pixels within that respective block in order to make the video window fully transparent. In other example, a constant value (or reference value) may be any other number and/or may represent other values for a pixel (e.g., RGB values, etc.).

The reference block ID or identifier, as shown, may be one or more of a number, alpha value, alpha-numeric value, and/or any other identifier for uniquely identifying a reference block and/or macroblock within a dataset (e.g., frame, set of frames, video, GUI, etc.). In some examples, one or more reference block IDs may be used to specify a reference block and/or macroblock. For example, a first block within a first frame may reference a second block within the first frame (e.g., to pull pixel value data from). Additionally or alternatively, a first block within a first frame (e.g., a P-frame, etc.) may reference a second block within a second frame (e.g., that shares a common location, position, and/or coordinates within each respective frame). In some such examples, the reference block ID in the first frame may be the same as (or similar to) the unique block ID in the second frame.

The block raw header 702, as shown, may comprise one or more of a Tform type or transform type, a unique block ID or identifier, a length (or dimensions), a raw block buffer, and/or the like as described herein. The block raw header 702, as shown, may comprise a Tform type (or transform type) indicating a raw block buffer type and/or that the block raw header 702 is associated with a block comprising a raw block buffer or unencoded block buffer. In some examples, the block raw header 702 may be applied to any or all blocks that are generated and/or modified using the block raw transform. In some examples, the block raw transform may generate a block raw transform block that contains an unencoded block buffer. In some such examples, the length of the unencoded block buffer may be denoted by length and/or may be a fixed size of 256-bytes for 16-byte block lengths.

The block encoded header 704, as shown, may comprise one or more of a Tform type or transform type, a unique block ID or identifier, a length (or dimensions), an encoded block buffer, and/or the like as described herein. The block encoded header 704, as shown, may comprise a Tform type (or transform type) indicating an encoded block buffer type and/or that the block encoded header 704 is associated with a block comprising an encoded block buffer (e.g., encoded in H.264, a GPU tile based framebuffer compression format, and/or the like as described herein). In some examples, the block encoded header 704 may be applied to any or all blocks that are generated and/or modified using the block encoded transform. In some examples, the block encoded transform may generate a block encoded transform block that contains an Arm Framebuffer Compression (AFBC) (or other lossless image compression protocol and/or format) encoded block. In some such examples, the length of the block buffer may be variable in size and/or may be denoted by length. For AFBC in particular, the encoded block header (or superblock header) is prepended to the encoded block buffer. In some examples, the block encoded transform may generate a block encoded transform block that contains one or more GPU tile based framebuffer compression formats as described herein.

The macroblock raw header 706, as shown, may comprise one or more of a Tform type or transform type, a unique block ID or identifier, a length (or dimensions), a raw macroblock buffer, and/or the like as described herein. The macroblock raw header 706, as shown, may comprise a Tform type (or transform type) indicating a raw macroblock buffer type and/or that the macroblock raw header 706 is associated with a macroblock comprising a raw macroblock buffer or unencoded macroblock buffer. In some examples, the macroblock raw header 706 may be applied to any or all blocks that are generated and/or modified using the macroblock raw transform. In some examples, the macroblock raw transform may generate a macroblock raw transform block that contains an unencoded macroblock buffer. In some such examples, the length of the macroblock buffer may be denoted by length and/or may be a fixed size of 4096-bytes for 64-byte macroblock lengths. In some examples, the macroblock raw transform may be used if the total size of the encoded blocks within a macroblock is greater than (or exceeds) the length of a raw macroblock buffer.

The macroblock constant header 708, as shown, may comprise one or more of a Tform type or transform type, a unique block ID or identifier, a constant value (or reference value), and/or the like as described herein. The macroblock constant header 708, as shown, may comprise a Tform type (or transform type) indicating a macroblock constant type and/or that the macroblock constant header 708 is associated with a macroblock comprising a constant value, or reference value, (e.g., instead of a macroblock buffer). In some examples, the macroblock constant header 708 may be applied to any or all blocks that are generated and/or modified using the macroblock constant transform. In some examples, the macroblock constant transform may generate a macroblock constant transform block that contains a single value that will apply to any or all pixels (and/or blocks) within the macroblock. In some examples, the unique block ID of a macroblock constant transform block may be set to a block offset value of 0 within the relevant macroblock.

The block constant header 710, as shown, may comprise one or more of a Tform type or transform type, a unique block ID or identifier, a constant value (or reference value), and/or the like as described herein. The block constant header 710, as shown, may comprise a Tform type (or transform type) indicating a block constant type and/or that the block constant header 710 is associated with a block comprising a constant value, or reference value, (e.g., instead of a block buffer). In some examples, the block constant header 710 may be applied to any or all blocks that are generated and/or modified using the block constant transform. In some examples, the block constant transform may generate a block constant transform block that contains a single value that will apply to any or all pixels within the block. In some examples, the unique block ID of a block constant transform block may be set to a block offset value of 0 within the relevant block.

The coalesce last header 712, as shown, may comprise one or more of a Tform type or transform type, a unique block ID or identifier, reference block ID or identifier, and/or the like as described herein. The coalesce last header 712, as shown, may comprise a Tform type (or transform type) indicating a coalesce last block (or macroblock) type and/or that the coalesce last header 712 is associated with a block (or macroblock) comprising a reference block ID or identifier to a block (or macroblock) of a previous frame (e.g., instead of a block buffer). In some examples, the coalesce last header 712 may be applied to any or all blocks that are generated and/or modified using the coalesce last transform. In some examples, the coalesce last transform may generate a coalesce last transform block that contains a unique block ID for a reference block (or macroblock) (i.e., the coalesce last transform block that contains a reference block ID indicating a previous block or macroblock within a previous frame). In some examples, the reference block, or macroblock, from a previous frame may be copied to the frame containing the coalesce last transform block. In such examples, the reference block, or macroblock, may replace the coalesce last transform block (or macroblock). In other examples, one or more values (e.g., an Alpha value, etc.) may be copied from the reference block, or macroblock, from a previous frame into the coalesce last transform block (or macroblock).

In some examples, one or more block coalescing operations may compare each block and/or macroblock within a current frame to any and/or all blocks within a previous frame. In some such examples, if a duplicate block is found (or identified), the duplicate block is marked (or targeted) in place (e.g., at the current position within the frame, framebuffer, blockbuffer, and/or the like) and the frame and/or buffer is reduced (or shrinks) to accommodate the change. For example, the duplicate block may be identified as a target block (e.g., a target of a transform operation, etc.) and may be removed from the frame and/or buffer data and replaced, at least in part, with a reference block ID which may comprise a smaller size. In some examples, a greedy algorithm may be used (e.g., one or more block coalescing operations) based, at least in part, on rectangular Alpha change patterns. It should be appreciated that during observation (e.g., of experiments) Alpha changes tend to follow a rectangular pattern. In some examples, instead of comparing each block and/or macroblock within a current frame to any and/or all blocks within a previous frame, a greedy algorithm may limit the comparison to any and/or all blocks in a corresponding row and/or column within a previous frame. For instance, for 16×16 blocks, the greedy algorithm (and/or row/column limitation technique) may limit a search space for duplicate blocks (from a full frame) down to 187-blocks out of 8160-blocks total within a 1920×1088 frame. In some examples, one or more block coalescing last operations may utilize a temporal cache (e.g., in memory, etc.) to track, catch, or identify one or more alpha changes that may be moving across the screen (e.g., across a two or more frames from left to right and/or any other direction relative to the screen of display). In some such examples, instead of referencing the current (or delta) frame, there may be a special designation (e.g., a second reference block ID, Tform type, and/or the like) to indicate whether a target block (and/or target macroblock) is referring to a previous frame and/or the current (or delta) frame.

The coalesce current header 714, as shown, may comprise one or more of a Tform type or transform type, a unique block ID or identifier, reference block ID or identifier, and/or the like as described herein. The coalesce current header 714, as shown, may comprise a Tform type (or transform type) indicating a coalesce current block (or macroblock) type and/or that the coalesce current header 714 is associated with a block (or macroblock) comprising a reference block ID or identifier to a block within a current (or the same) frame (e.g., instead of a block buffer). In some examples, the coalesce current header 714 may be applied to any or all blocks that are generated and/or modified using the coalesce current transform. In some examples, the coalesce current transform may generate a coalesce current transform block that contains a unique block ID for a reference block (or macroblock) (i.e., the coalesce current transform block that contains a reference block ID indicating a block or macroblock within the same frame as the coalesce current transform block). In some examples, the reference block, or macroblock, may be copied to the position or location within the shared, common, or current frame containing the coalesce current transform block. In such examples, a copy of the reference block, or macroblock, may replace the coalesce current transform block (or macroblock). In other examples, one or more values (e.g., an Alpha value, etc.) may be copied from the reference block, or macroblock, into the coalesce current transform block (or macroblock). In some examples, if unique block IDs are processed in non-decreasing order, then the reference block ID may be lesser (e.g., lower in an ordered sequence or series of values) than the unique block ID of the coalesce current transform block. For example, when searching the frame for duplicate blocks (or macroblocks) an algorithm (or the like as described herein) may identify the reference block first, then after continued searching, may identify (and/or mark) a second block for the coalesce current transform. In such examples, the unique block ID of the reference block (i.e., reference block ID) will come before the unique block ID of the coalesce current transform block.

In some examples, one or more block coalescing operations may compare each block and/or macroblock within a current frame to any and/or all other blocks within the current frame. In some such examples, if a duplicate block is found (or identified), the duplicate block is marked (or targeted) in place (e.g., at the current position within the frame, framebuffer, blockbuffer, and/or the like) and the frame and/or buffer is reduced (or shrinks) to accommodate the change. For example, the duplicate block may be identified as a target block (e.g., a target of a transform operation, etc.) and may be removed from the frame and/or buffer data and replaced, at least in part, with a reference block ID which may comprise a smaller size. In some examples, a greedy algorithm may be used (e.g., one or more block coalescing operations) based, at least in part, rectangular Alpha change patterns. It should be appreciated that during observation (e.g., of experiments) Alpha changes tend to follow a rectangular pattern. In some examples, instead of comparing each block and/or macroblock within a current frame to any and/or all other blocks within the current frame, a greedy algorithm may limit the comparison to any and/or all other blocks within the same row and/or column of the current frame. For instance, for 16×16 blocks, the greedy algorithm (and/or row/column limitation technique) may limit a search space for duplicate blocks (from a full frame) down to 187-blocks out of 8160-blocks total within a 1920×1088 frame.

It should be appreciated that, in some examples, the second encoder 108B (as described above in connection with FIG. 1), and/or the like as described herein, may apply one or more of the block raw transform, block encoded transform, macroblock raw transform, macroblock constant transform, block constant transform, coalesce last transform, coalesce current transform, and/or the like (as described herein in connection with at least FIGS. 7A-7B), in accordance with various aspects and/or implementations of the present disclosure. Additionally or alternatively, the second encoder 108B, and/or the like as described herein, may generate one or more of a block raw transform block, block encoded transform block, macroblock raw transform block, macroblock constant transform block, block constant transform block, coalesce last transform block, coalesce current transform block, and/or the like, in accordance with various aspects and/or implementations of the present disclosure.

In some examples, one or more of a block raw transform block, block encoded transform block, macroblock raw transform block, macroblock constant transform block, block constant transform block, coalesce last transform block, coalesce current transform block, and/or the like as described herein, may be applied to a GUI bitstream (e.g., a raw YUV 4:2:0 stream) incrementally by an encoder device (e.g., encoder device 102) and a decoder device (e.g., decoder device 112). It should be appreciated that because the transformed (described herein) are lossless, a comparison can be made between a bitstream before and after application with the transforms to check for errors and/or to ensure that there are not discrepancies in the data. Further, the transformed bitstream (e.g., comprising one or more transform blocks) may be compared (e.g., comparing sizes, lengths, etc.) to an original or raw bitstream (e.g., a raw YUV 4:2:0 stream or the like) and/or to an encoded bitstream (e.g., an H.264 encoded bitstream, and/or the like, without or without one or more transform blocks). It should be appreciated that experimental comparisons indicate that the average bitrate for 60 FPS (Mbps) for a transform bitstream (in accordance with the present disclosure) comprising delta frames, block sets, macroblock sets, transform blocks (e.g., coalesce blocks, etc.), and AFBC encoded blocks are within the threshold bitrate ranges for a standard H.264 encode GUI file. Accordingly, it should be further appreciated that the transform bitstream provides the advantages described herein for the present disclosure (e.g., reduced computational burden on a decoder device, etc.) and, advantageously, does not increase demand on (or sacrifice the performance of) communications networks (e.g., communications network 110, etc.) and/or communications hardware (e.g., network interface(s) 806, routers, base stations, etc.) when compared to traditional systems and/or techniques.

Now that example frame headers associated with various block transforms have been described above with reference to FIGS. 7A and 7B, a block diagram for an example electronic device will now be described below with reference to FIG. 8.

Figure 8:
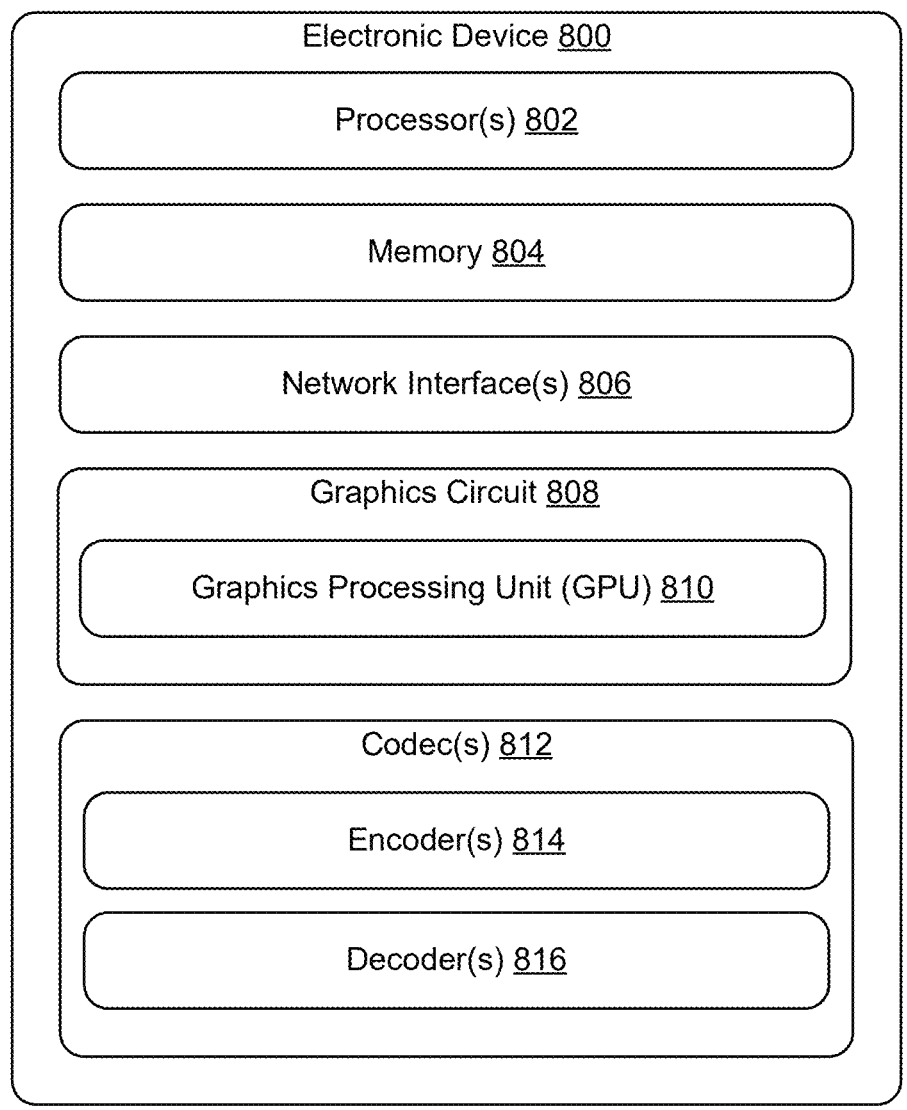
FIG. 8 illustrates a block diagram for an example electronic device, in accordance with various aspects of the present disclosure.

FIG. 8 illustrates a block diagram for an example electronic device, in accordance with various aspects of the present disclosure. The electronic device 800, as shown, comprises the processor(s) 802, memory 804, network interface(s) 806, graphics circuit 808, and codec(s) 812. The graphics circuit 808 (e.g., graphics chip, SoC, integrated circuit, graphics card, etc.), as shown, may comprise at least one Graphics Processing Unit (GPU) 810. In some examples, the graphics circuit 808 may further comprise dedicated memory and/or may leverage the memory 804. In some examples, the GPU 810 (and/or the like) may comprise one or more features and/or aspects (e.g., multiple processors, multiple cores, cores of different types, etc.) described herein for the processor(s) 802. For example, the graphics circuit 808 may have a dedicated processor (e.g., GPU 810) and/or may further leverage the processor(s) 802 (e.g., CPU(s)). The processor(s) 802 may perform various functions associated with controlling an operation of the electronic device 800, and the memory 804 may store instructions executable by the processor(s) 802 to perform the operations described herein.

The codec(s) 812, as shown, may comprise one or more software and/or hardware based encoder(s) 814 and/or one or more software and/or hardware based decoder(s) 816. The codec(s) 812, as shown, may comprise one or more video (or non-video) codecs, such as H.264 (or AVC), H.265 (or HEVC), AV1, and/or the like, for compressing and decompressing digital video data (e.g., a 4K movie, a GUI, etc.). In some examples, the codec(s) 812 may further comprise one or more GPU tile based framebuffer compression formats specific to a respective GPU manufacturer. For example, a first electronic device (e.g., electronic device 800) may be embodied as a streaming server equipped with H.264, H.265, a first GPU tile based framebuffer compression format, and a second GPU tile based framebuffer compression format. In such examples, the streaming server may stream data to a first client device (e.g., electronic device 800) in H.264 and a first GPU tile based framebuffer compression format and to a second client device (e.g., electronic device 800) in H.264 and a second GPU tile based framebuffer compression format.

Network interface(s) 806 permit the electronic device 800 to communicate over one or more networks. Example network interface(s) 806 include, without limitation, a Wi-Fi circuit (e.g., Dual-band 802.11 a/b/g/n/ac/ax 2×2 MIMO dual-antenna, Tri-band 802.11 a/b/g/n/ac/ax 2×2 MIMO dual-antenna, etc.), ZigBee circuit, Bluetooth circuit (e.g., Bluetooth 5.2, Bluetooth Low Energy (BLE), etc.), LTE circuit, and/or any other communications protocol, hardware, software, and/or firmware. The network interface(s) 806 permit communication with remote device(s), such as mobile devices (e.g., phones, television remotes, microphones, etc.), systems (e.g., cloud services, remote servers, etc.), and/or the like. The network(s) may be representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, Bluetooth, etc.), and/or other connection technologies.

In some instances, inbound data (e.g., from remote servers, television remotes, etc.) may be routed through the network interface(s) 806 before being directed to the processor(s) 802, and outbound data from the processor(s) 802 may be routed through the network interface(s) 806. The network interface(s) 806 may therefore receive inputs, such as data, from the processor(s) 802, the GPU 810, and/or any other component described herein. For example, the network interface(s) 806 may be configured to transmit data to and/or receive data from one or more network devices (e.g., Wi-Fi routers, etc.). The network interface(s) 806 may act as a conduit for data communicated between various components and the processor(s) 802 and/or the like. In some examples, the electronic device 800 may be powered, at least in part, by a USB port of a host device (e.g., a television), mains electricity (e.g., a wall socket coupled to a public power grid), one or more batteries (e.g., rechargeable and/or non-rechargeable), and/or the like as described herein.

As used herein, a processor or CPU, such as the processor(s) 802, may include multiple processors and/or a processor having multiple cores. Further, the processor(s) 802 may comprise one or more cores of different types. For example, the processor(s) 802 may include application processor units, graphic processing units, and so forth. In one implementation, the processor(s) 802 may comprise a microcontroller and/or a microprocessor. The processor(s) 802 may include a microprocessor, a digital signal processor or other processing units or components known in the art. Alternatively, or in addition, the functionality described herein can be performed, at least in part, by one or more hardware logic components. For example, and without limitation, illustrative types of hardware logic components that may be used include Field-Programmable Gate Arrays (FPGAs), Application-Specific Integrated Circuits (ASICs), Application-Specific Standard Products (ASSPs), System on a Chip (SoC), Complex Programmable Logic Devices (CPLDs), and/or the like. Additionally, each of the processor(s) 802 may possess its own local memory, which also may store at least one of program components, program data, program code, program instructions, firmware, software, Operating Systems (OS), and/or the like.

Memory, such as the memory 804, may include volatile and nonvolatile memory, removable and non-removable media implemented in any method or technology for storage of information, such as computer-readable instructions, data structures, program component, firmware, software, and/or any other data. The memory 804 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 804 may be implemented as Computer-Readable Storage Media (CRSM), which may comprise any available physical media accessible by the processor(s) 802 to execute instructions stored on the memory. In some examples, a CRSM may include random access memory (RAM) and flash memory (e.g., NAND flash, NOR flash, etc.). In other implementations, CRSM may include, but is not limited to, Read-Only Memory (ROM), Electrically Erasable Programmable Read-Only Memory (EEPROM), or any other tangible medium which can be used to store the desired information, and which can be accessed by the processor(s). The memory 804 are examples of non-transitory computer-readable media. The memory 804 may store an Operating System (OS) and one or more software applications, instructions, programs, and/or data to implement the methods described herein and the functions attributed to the various systems.

Although certain components of the electronic device 800 are illustrated, it is to be understood that the electronic device 800 may include additional and/or alternative components. For example, the electronic device 800 may include other input/output devices (e.g., display, screen, light emitting diode (LED), etc.), heat dissipating elements (e.g., heatsinks, fans, vents, etc.), computing components (e.g., Printed Circuit Boards (PCBs), the like, and/or any other components described above in connection with at least FIG. 1. In some examples, one or more components illustrated for the electronic device 800 may be removed. Examples of the electronic device 800 may include, without limitation, a server, desktop computer, laptop, smartphone, smart television, streaming device (e.g., streaming stick, etc.), and/or the like as described herein.

Now that a block diagram for an example electronic device has been described above with reference to FIG. 8, an example flowchart of an example process using Alpha channel inter-frame and/or intra-frame compression will now be described below with reference to FIG. 9.

Figure 9:
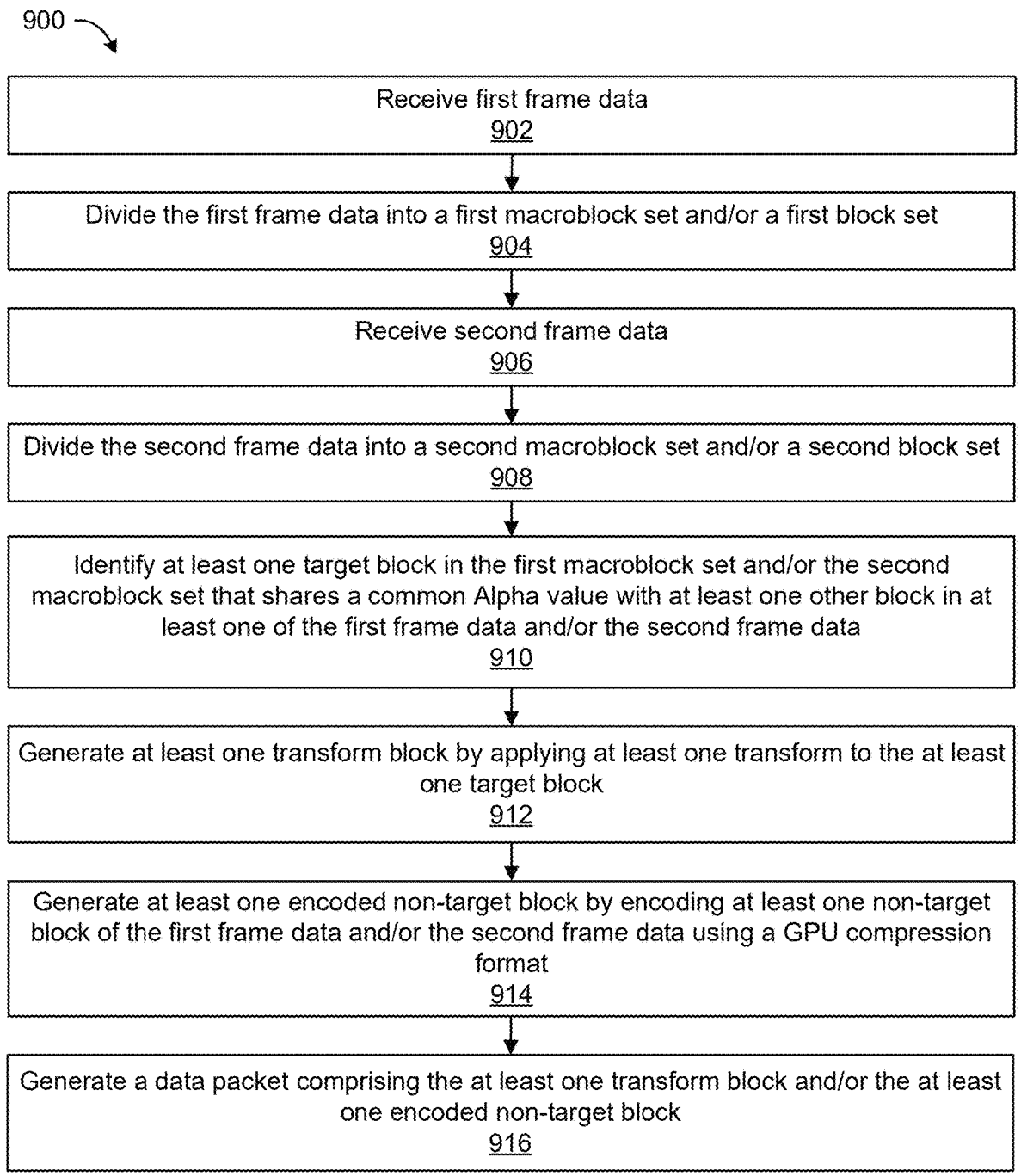
FIG. 9 illustrates an example flowchart of an example process using Alpha channel inter-frame and/or intra-frame compression, in accordance with various aspects of the present disclosure.

FIG. 9 illustrates an example flowchart of an example process using Alpha channel inter-frame and/or intra-frame compression, in accordance with various aspects of the present disclosure. As shown, the process 900 may be used for Alpha channel inter-frame and/or intra-frame compression. The operations of the process 900 may represent a series of instructions comprising computer readable machine code executable by a processing unit (e.g., processor(s) 802) of one or more computing devices described herein (e.g., electronic device 800, streaming server, etc.), although various operations may also be implemented in, or using, hardware (e.g., SoC, integrated circuit, etc.). In some examples, the computer readable machine codes may be comprised of instructions selected from a native instruction set of at least one processor and/or an operating system of the electronic device 800. In some examples, the process 900 may be performed, at least in part, by one or more components of electronic device 800, encoder device 102, and/or decoder device 112. For example, the process 900 may be performed by an electronic device comprising at least one processor and at least one computer readable media storing processor executable instructions which, when executed using the at least one processor, causes the electronic device to perform, at least in part, one or more of operations 902-916, and/or the like, as described herein.

As shown in FIG. 9, the process 900 may begin at operation 902, at which the electronic device 800 (or the like as described herein) may receive first frame data. In some examples, the operation 902 may comprise receiving a first frame representative of a graphical user interface at a first time. In some examples, the first frame data comprises RGBA data comprising RGB data and Alpha data.

The process 900 may continue at operation 904, at which the electronic device 800 (or the like as described herein) may divide the first frame data into a first macroblock set and/or a first block set. In some examples, the operation 904 may comprise dividing the first frame (e.g., the first frame data) into a first macroblock set. In some examples, the operation 904 may comprise dividing the first macroblock set into a first block set. In some examples, each respective macroblock of the first macroblock set may comprise a respective subset of blocks and/or each respective block of the first block set comprises 16×16 pixels and/or each respective block of the first block set comprises respective Alpha data for each respective pixel within that respective block. In some examples, the operation 904 may comprise generating a first blockbuffer representative of the first frame, wherein the first blockbuffer comprises a first index indicating the first macroblock set organized into layers of rows.

In some examples, the process 900 may proceed from the operation 902 and/or the operation 904 (as described above) to one or more of operations 910-916 (as described below), such as to apply one or more transforms to one or more blocks (and/or the like) of the first frame. For example, the electronic device 800 (or the like as described herein) may receive and divide the first frame data (as described above) and may identify at least one target block in the first macroblock set (e.g., as described at operation 910). Additionally, the electronic device 800 (or the like as described herein) may process the identified at least one target block in accordance with one or more of operations 912-916. For instance, the electronic device 800 (or the like as described herein) may apply one or more block transforms (as described herein) to the least one target block in the first macroblock set of the first frame. In some such examples, after performing one or more intra-frame compression techniques (and/or the like) on the first frame data, the process 900 may proceed to the operation 906 and perform one or more intra-frame and/or inter-frame compression techniques (and/or the like) on the second frame data.

The process 900 may continue at operation 906, at which the electronic device 800 (or the like as described herein) may receive second frame data. In some examples, the operation 906 may comprise receiving a second frame representative of the graphical user interface at a second time. In some examples, the second frame comprises RGBA data comprising RGB data and Alpha data.

The process 900 may continue at operation 908, at which the electronic device 800 (or the like as described herein) may divide the second frame data into a second macroblock set and/or a second block set. In some examples, the operation 908 may comprise dividing the second frame (e.g., the second frame data) into a second macroblock set. In some examples, the operation 908 may comprise dividing the second macroblock set into a second block set. In some examples, each respective macroblock of the second macroblock set comprises a respective subset of blocks and/or each respective block of the second block set comprises 16×16 pixels and/or each block of the second block set comprises the Alpha data associated with each respective pixel. In some examples, the operation 908 may comprise generating a second blockbuffer representative of the second frame, wherein the second blockbuffer comprises a second index indicating the second macroblock set organized into layers of rows.

The process 900 may continue at operation 910, at which the electronic device 800 (or the like as described herein) may identify at least one target block in the first macroblock set and/or the second macroblock set that shares a common Alpha value with at least one other block in at least one of the first frame data and/or the second frame data. In some examples, the operation 910 may comprise comparing the second macroblock set to the first macroblock set. For example, the electronic device 800 may compare each block and/or macroblock of the first frame to any and/or all blocks and/or macroblocks of the second frame data (e.g., an inter-frame frame comparison). In some examples, the operation 910 may comprise comparing the first macroblock set and/or the second macroblock set to itself (e.g., an intra-frame frame comparison). For example, the electronic device 800 may compare each block and/or macroblock of the second frame to any and/or all other blocks and/or macroblocks of the second frame. Additionally or alternatively, the electronic device 800 may compare each block and/or macroblock of the first frame to any and/or all other blocks and/or macroblocks of the first frame. In some examples, the operation 910 may comprise identifying at least one target block that is in the first macroblock set and/or the second macroblock set. In some such examples, the at least one target block shares a common Alpha value with at least one other block in at least one of the first frame and/or the second frame. In some examples, the operation 910 may comprise searching each row of the first index and/or each row of the second index for the at least one target block in the first macroblock set and/or the second macroblock set. In some such examples, the at least one target block shares at least an Alpha value with at least one of a respective block in the first macroblock set and/or a respective block in the second macroblock set.

The process 900 may continue at operation 912, at which the electronic device 800 (or the like as described herein) may generate at least one transform block by applying at least one transform to the at least one target block. In some examples, the operation 912 may comprise replacing the at least one target block in the second macroblock set with a transform block comprising at least one of a transform type, a unique block identifier, a length value, a constant Alpha value, a raw blockbuffer, a raw macrobuffer, an encoded blockbuffer, an encoded macrobuffer, a reference value to the respective block in the first macroblock set, or a reference value to a similar block in the second macroblock set.

In some examples, the operation 912 (e.g., applying at least one transform to the at least one target block) may comprise replacing the at least one target block in the second macroblock set with a pseudo transform block comprising a unique block identifier and/or a cached pixel value referencing a block in the first frame. In some examples, if a unique block ID is not present in a transform and/or a header, that unidentified block and/or macroblock may automatically default to using the cached pixel values for a previous block and/or macroblock from the previous frame. For example, a previous block and/or macroblock may share a location (or coordinate) within the previous frame that matches a location (or coordinate) of the unidentified block and/or macroblock in the current frame. It should be appreciated that because Alpha values change infrequently this technique may be used frequently to reduce the number of blocks that need to be transmitted between an encoder device (e.g., encoder device 102) and a decoder device (e.g., decoder device 112).

In some examples, the operation 912 (e.g., applying at least one transform to the at least one target block) may comprise replacing the at least one target block in the second macroblock set with a transform block comprising a block raw transform type, a unique block identifier, a length value, and a raw blockbuffer. In some such examples, the operation 912 may comprise applying a block raw transform to a block to generate a block raw transform block as described above in connection with FIGS. 7A-7B.

In some examples, the operation 912 (e.g., applying at least one transform to the at least one target block) may comprise replacing the at least one target block in the second macroblock set with a transform block comprising a block encoded transform type, a unique block identifier, a length value, and an encoded blockbuffer. In some examples, the encoded blockbuffer is encoded using a GPU compression format and/or the like as described herein. In some such examples, the operation 912 may comprise applying a block encoded transform to a block to generate a block encoded transform block as described above in connection with FIGS. 7A-7B.

In some examples, the operation 912 (e.g., applying at least one transform to the at least one target block) may comprise determining that a total size of an encoded macroblock comprising the transform block exceeds the length of a raw macroblock buffer and/or replacing a respective macroblock comprising the transform block with a transform macroblock comprising a macroblock raw transform type, a unique macroblock identifier, a length value, and the raw macroblock buffer. In some such examples, the operation 912 may comprise applying a macroblock raw transform to a block to generate a macroblock raw transform block as described above in connection with FIGS. 7A-7B.

In some examples, the operation 912 (e.g., applying at least one transform to the at least one target block) may comprise replacing the at least one target block in the second macroblock set with a transform block comprising a block constant transform type, a unique block identifier, and a constant Alpha value. In some such examples, the operation 912 may comprise applying a block constant transform to a block to generate a block constant transform block as described above in connection with FIGS. 7A-7B.

In some examples, the operation 912 (e.g., applying at least one transform to the at least one target block) may comprise replacing a respective macroblock comprising the at least one target block in the second macroblock set with a transform macroblock comprising the macroblock constant transform type, a unique macroblock identifier, and the constant Alpha value. In some examples, the constant Alpha value is applied to all pixels within a respective block or respective macroblock. In some such examples, the operation 912 may comprise applying a macroblock constant transform to a block to generate a macroblock constant transform block as described above in connection with FIGS. 7A-7B.

In some examples, the operation 912 (e.g., applying at least one transform to the at least one target block) may comprise replacing the at least one target block in the second macroblock set with a transform block comprising a coalesce last transform type, a unique block identifier, and a reference block identifier. In some examples, the reference block identifier indicates a reference block from the first frame to copy to a location of the at least one target block in the second frame. In some such examples, the operation 912 may comprise applying a coalesce last transform to a block to generate a coalesce last transform block as described above in connection with FIGS. 7A-7B.

In some examples, the operation 912 (e.g., applying at least one transform to the at least one target block) may comprise replacing the at least one target block in the second macroblock set with a transform block comprising a coalesce current transform type, a unique block identifier, and a reference block identifier. In some examples, the reference block identifier indicates a reference block from the second frame to copy to a location of the at least one target block in the second frame and/or the reference block identifier is a lower number than the unique block identifier. In some such examples, the operation 912 may comprise applying a coalesce current transform to a block to generate a coalesce current transform block as described above in connection with FIGS. 7A-7B.

The process 900 may continue at operation 914, at which the electronic device 800 (or the like as described herein) may generate at least one encoded non-target block by encoding at least one non-target block of the first frame data and/or the second frame data using a GPU compression format and/or any other formats as described herein (e.g., H.264, H.265, AV1, etc.). In some such examples, the operation 914 may comprise generating at least one encoded non-target block by encoding at least one non-target block of the second frame using a second GPU compression format and/or any other second formats as described herein (e.g., H.264, H.265, AV1, etc.). In some examples, the at least one non-target block is a unique block with respect to the first frame and/or the second frame. For example, the at least one non-target block may not share one or more values (e.g., Alpha values, RGB values, etc.) with any other block and/or macroblock in the first frame and/or the second frame.

The process 900 may continue at operation 916, at which the electronic device 800 (or the like as described herein) may generate a data packet comprising the at least one transform block and/or the at least one encoded non-target block. In some examples, the operation 916 may comprise generating a data packet comprising at least one of a transform block, a target block, a duplicate block, and/or an encoded non-duplicate block of the first frame data and/or the second frame data. In some examples, the operation 916 may comprise transmitting the data packet to a client device. For example, an encoder device (e.g., encoder device 102) may transmit one or more data packets (e.g., comprising, at least in part, a bitstream representative of one or more GUI frames) to a decoder device (e.g., client device, decoder device 112, etc.) using, at least in part, a communications network (e.g., communications network 110, etc.).

Now that an example flowchart of an example process using Alpha channel inter-frame and/or intra-frame compression has been described above with reference to FIG. 9, an example flowchart of an example process for encoding data will now be described below with reference to FIG. 10.

Figure 10:
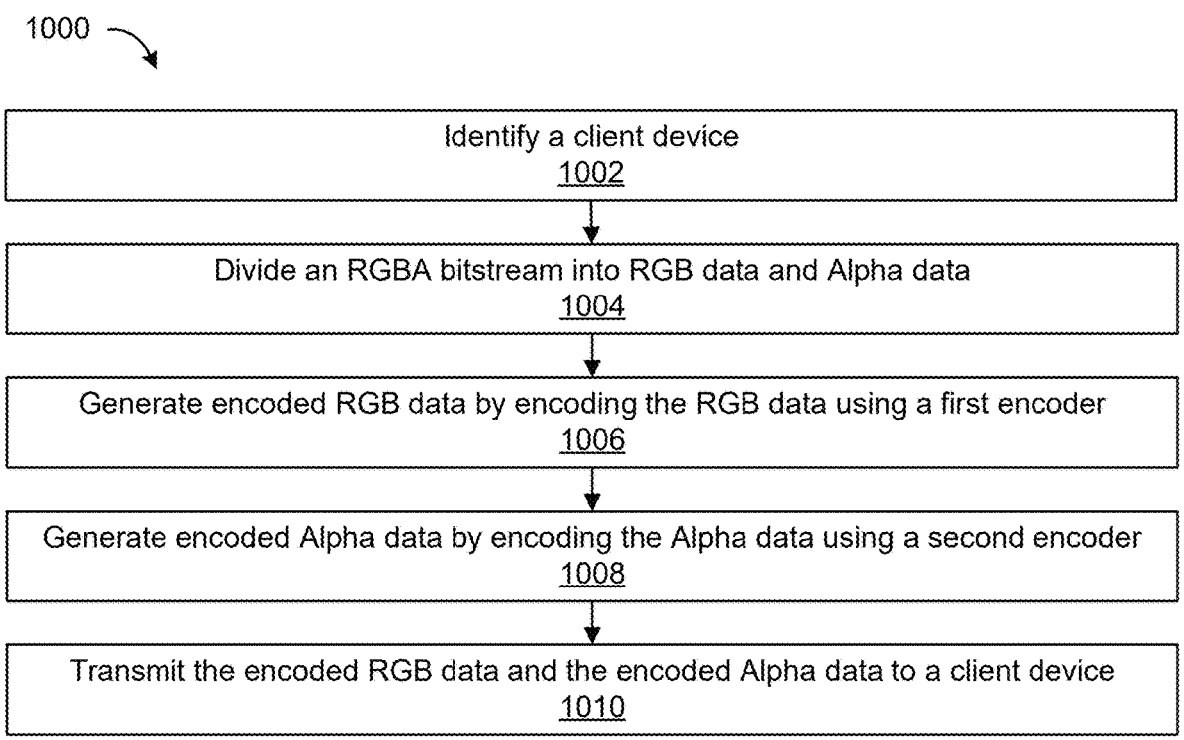
FIG. 10 illustrates an example flowchart of an example process for encoding data, in accordance with various aspects of the present disclosure.

FIG. 10 illustrates an example flowchart of an example process for encoding data, in accordance with various aspects of the present disclosure. As shown, the process 1000 may be used for encoding video data, such as for streaming a GUI, a movie, and/or the like. The operations of the process 1000 may represent a series of instructions comprising computer readable machine code executable by a processing unit (e.g., processor(s) 802) of one or more computing devices described herein (e.g., electronic device 800, streaming server, etc.), although various operations may also be implemented in, or using, hardware (e.g., SoC, integrated circuit, etc.). In some examples, the computer readable machine codes may be comprised of instructions selected from a native instruction set of at least one processor and/or an operating system of the electronic device 800. In some examples, the process 1000 may be performed, at least in part, by one or more components of electronic device 800, encoder device 102, and/or the like as described herein. For example, the process 1000 may be performed by an electronic device comprising at least one processor and at least one computer readable media storing processor executable instructions which, when executed using the at least one processor, causes the electronic device to perform, at least in part, one or more of operations 1002-1010, and/or the like, as described herein.

As shown in FIG. 10, the process 1000 may begin at operation 1002, at which the electronic device 800 (or the like as described herein) may identify a client device. In some examples, the operation 1002 may comprise identifying a client device for receipt of an RGBA bitstream. In some examples, the RGBA bitstream is representative of a graphical user interface comprising 1080p60 resolution and/or another resolution. In some examples, the operation 1002 may comprise performing one or more communications protocol procedures (e.g., a handshake protocol, etc.). In some examples, the operation 1002 may comprise receiving a full frame update request from a decoder device, a client device, and/or the like as described herein (e.g., decoder device 112, electronic device 800, etc.). In some examples, the operation 1002 may comprise receiving a partial frame update request from the decoder device, a client device, and/or the like as described herein. In some examples, the operation 1002 may comprise determining a GPU specification associated with the decoder device, a client device, and/or the like as described herein.

The process 1000 may continue at operation 1004, at which the electronic device 800 (or the like as described herein) may divide an RGBA bitstream into RGB data and Alpha data. In some examples, the operation 1004 may comprise dividing (e.g., using parser algorithm and/or the like as described herein) the RGBA bitstream into an RGB channel buffer (e.g., RGB data) and an Alpha channel buffer (e.g., Alpha data).

The process 1000 may continue at operation 1006, at which the electronic device 800 (or the like as described herein) may generate encoded RGB data by encoding the RGB data using a first encoder. In some examples, the operation 1006 may comprise generating encoded RGB data by encoding RGB data from the RGB channel buffer using a first encoder of the plurality of encoders. In some examples, the first encoder utilizes H.264, H.265, AV1, and/or any other video compression format described herein. In some examples, the operation 1006 may comprise compressing the encoded RGB data. In some examples, the operation 1006 may comprise generating encoded additional RGB data by encoding additional RGB data using a first encoder. In some examples, the additional RGB data is representative of pixel color information for a full frame of the graphical user interface. In some examples, the additional RGB data is representative of pixel color information for at least one block of the graphical user interface.

The process 1000 may continue at operation 1008, at which the electronic device 800 (or the like as described herein) may generate encoded Alpha data by encoding the Alpha data using a second encoder. In some examples, the operation 1008 may comprise generating encoded Alpha data by encoding Alpha data from the Alpha channel buffer with the second encoder. In some examples, a second encoder utilizes a hardware specific compression format (e.g., associated with a hardware component of a decoder device and/or the like as described herein). For example, the second encoder may utilize a GPU tile based framebuffer compression format (e.g., AFBC, etc.) that is specific to the GPU of the client device. In some examples, the operation 1008 may comprise determining a second encoder from the plurality of encoders based on compatibility with a GPU of the client device. In some examples, the operation 1008 may comprise selecting the second encoder based on the GPU specification associated with the decoder device. In some examples, the second encoder comprises at least one of a software encoder or a hardware encoder compatible with the GPU specification. In some examples, the operation 1008 may comprise generating encoded additional Alpha data by encoding additional Alpha data using a second encoder. In some examples, the additional Alpha data is representative of pixel opaqueness information for the at least one block of the graphical user interface. In some examples, the additional Alpha data is representative of pixel opaqueness information for the full frame of the graphical user interface.

In some examples, the operation 1008 may comprise performing a solid color optimization process. In some such examples, a solid color optimization process may comprise skipping encoding of the Alpha data for individual pixels. In some such examples, a solid color optimization process may comprise generating a full screen Alpha value frame. In some such examples, a solid color optimization process may comprise generating at least one additional Alpha value update frame.

The process 1000 may continue at operation 1010, at which the electronic device 800 (or the like as described herein) may transmit the encoded RGB data and the encoded Alpha data to a client device. In some examples, the operation 1010 may comprise transmitting the encoded RGB data and/or the encoded Alpha data to a client device (or the like as described herein). In some such examples, the encoded RGB data and/or the encoded Alpha data may each comprise at least one block of at least one frame of the graphical user interface. In some examples, the operation 1010 may comprise transmitting an at least partial frame update (e.g., a partial frame update, a full frame update, etc.) to the client device. In some such examples, the at least partial frame update comprises at least one block that has changed in the at least one frame of the graphical user interface of the encoded RGB data and/or the encoded Alpha data. In some such examples, the at least one block further comprises additional encoded RGB data and/or additional encoded Alpha data. In some examples, the operation 1010 may comprise transmitting encoded additional RGB data and/or encoded additional Alpha data to a decoder device (or the like as described herein). In some examples, the encoded additional RGB data and/or the encoded additional Alpha data may be representative of a full frame of the graphical user interface. In some examples, encoded additional RGB data and/or encoded additional Alpha data may be representative of the at least one block of the graphical user interface.

Now that an example flowchart of an example process for encoding data has been described above with reference to FIG. 10, an example flowchart of an example process for decoding data will now be described below with reference to FIG. 11.

Figure 11:
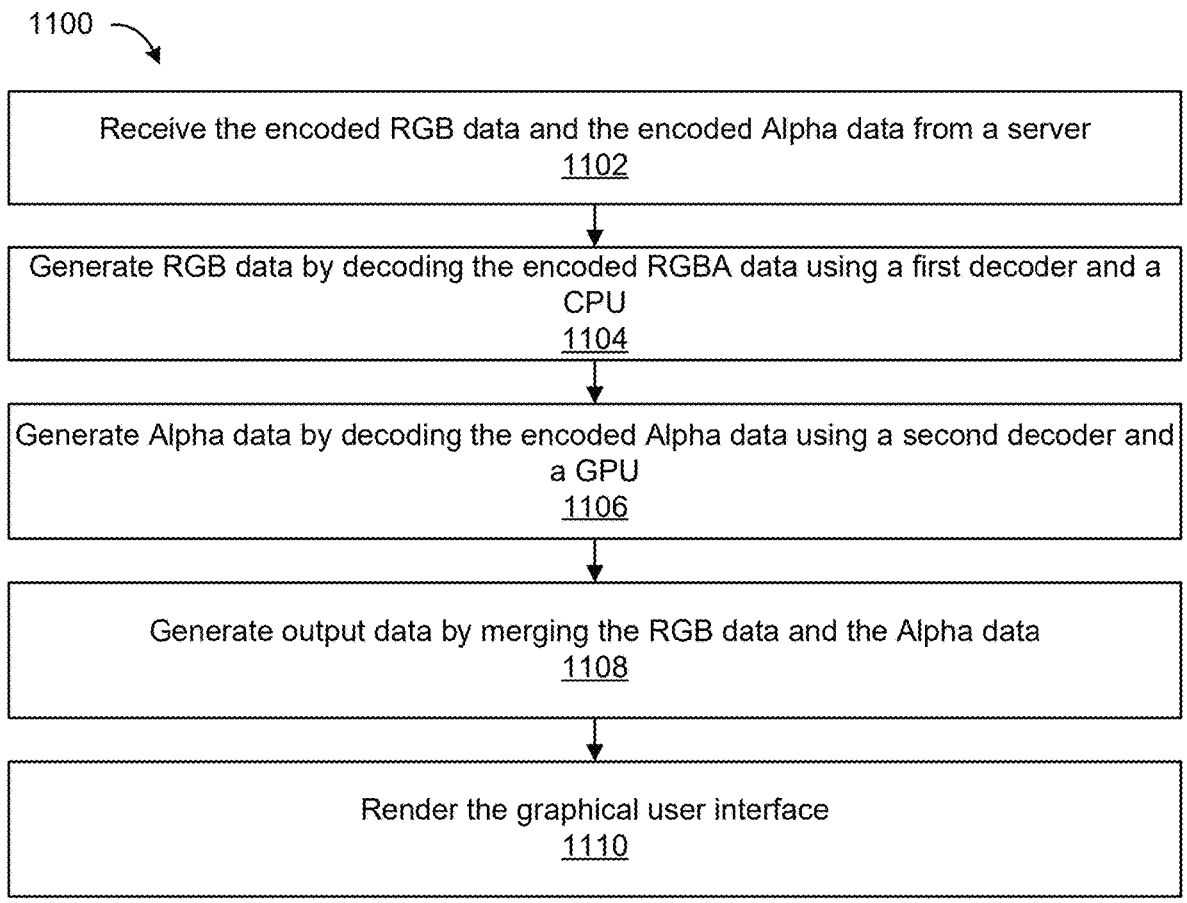
FIG. 11 illustrates an example flowchart of an example process for decoding data, in accordance with various aspects of the present disclosure.

FIG. 11 illustrates an example flowchart of an example process for decoding data, in accordance with various aspects of the present disclosure. As shown, the process 1100 may be used for decoding video data, such as for rendering a GUI, a movie, and/or the like on a screen or display of an electronic device 800. The operations of the process 1100 may represent a series of instructions comprising computer readable machine code executable by a processing unit (e.g., processor(s) 802) of one or more computing devices described herein (e.g., electronic device 800, streaming server, etc.), although various operations may also be implemented in, or using, hardware (e.g., SoC, integrated circuit, etc.). In some examples, the computer readable machine codes may be comprised of instructions selected from a native instruction set of at least one processor and/or an operating system of the electronic device 800. In some examples, the process 1100 may be performed, at least in part, by one or more components of electronic device 800, decoder device 112, a client device, and/or the like as described herein. For example, the process 1100 may be performed by an electronic device comprising at least one processor and at least one computer readable media storing processor executable instructions which, when executed using the at least one processor, causes the electronic device to perform, at least in part, one or more of operations 1102-1110, and/or the like, as described herein.

As shown in FIG. 11, the process 1100 may begin at operation 1102, at which the electronic device 800 (or the like as described herein) may receive the encoded RGB data and the encoded Alpha data from a server. In some examples, the operation 1100 may comprise receiving encoded RGB data and/or encoded Alpha data from a streaming server, an encoder device (e.g., encoder device 102), and/or the like as described herein. In some examples, the operation 1100 may comprise receiving an at least partial frame update (e.g., partial frame update, full frame update, etc.) from the streaming server and/or the like as described herein. In some such examples, the at least partial frame update may comprise additional encoded RGB data, additional encoded Alpha data, and/or the like as described herein.

The process 1100 may continue at operation 1104, at which the electronic device 800 (or the like as described herein) may generating RGB data by decoding the encoded RGBA data using at least one of a first decoder, a CPU, and/or the like as described herein. In some examples, the operation 1104 may comprise generating (e.g., regenerating, reconstructing, etc.) the RGB data by decoding the encoded RGB data using the decoder and the CPU of the client device. In some examples, the operation 1104 may comprise decompressing the RGB data using the CPU and/or the like as described herein. In some examples, the operation 1104 may comprise generating (e.g., regenerating, reconstructing, etc.) the additional RGB data by decoding the additional encoded RGB data using the decoder and the CPU of the client device. In some examples, the operation 1104 may comprise decompressing additional RGB data.

The process 1100 may continue at operation 1106, at which the electronic device 800 (or the like as described herein) may generating Alpha data by decoding the encoded Alpha data using at least one of a second decoder, a GPU, and/or the like as described herein. In some examples, the operation 1106 may comprise generating (e.g., regenerating, reconstructing, etc.) the Alpha data by decoding the encoded Alpha data using the decoder, the GPU of the client device, and/or the like as described herein. In some examples, the Alpha data retains (or comprises) the GPU tile based framebuffer compression format (e.g., after decoding, etc.). In some examples, the operation 1106 may comprise generating (e.g., regenerating, reconstructing, etc.) the additional Alpha data by decoding the additional encoded Alpha data using the decoder and the GPU of the client device. In some examples, the additional Alpha data retains (or comprises) the GPU tile based framebuffer compression format (e.g., after decoding, etc.).

The process 1100 may continue at operation 1108, at which the electronic device 800 (or the like as described herein) may generate output data by merging the RGB data and the Alpha data. For example, the electronic device 800 may leverage a (software and/or hardware) multiplexer (e.g., multiplexer 134) to blend, merge, combine, and/or reconstruct a frame (e.g., video frame, GUI frame, etc.) from, at least in part, the RGB data and the Alpha data. In some examples, the output data (e.g., output data 132) may comprise at least one of first frame data and/or second frame data.

The process 1100 may continue at operation 1110, at which the electronic device 800 (or the like as described herein) may render the graphical user interface. In some examples, the operation 1110 may comprise rendering the graphical user interface based, at least in part, on the output data and using at least one of the Alpha data, the GPU, the RGB data, the CPU, and/or the like as described herein. In some examples, the operation 1110 may comprise rendering, at least in part, a graphical user interface from RGB data, such as by using at least the GPU of the client device and/or the like as described herein. In some examples, the operation 1110 may comprise rendering and/or natively rendering, at least in part, a graphical user interface using Alpha data comprising the GPU tile based framebuffer compression format, such as by using the GPU of the client device and/or the like as described herein. In some examples, the operation 1110 may comprise re-rendering, at least in part, a graphical user interface (e.g., previously rendered from a first frame, previous frame, Alpha data, RGB data, and/or the like as described herein) with the additional RGB data, such as by using the GPU of the client device and/or the like as described herein. In some examples, the operation 1110 may comprise re-rendering and/or natively re-rendering, at least in part, a graphical user interface (e.g., previously rendered from a first frame, previous frame, Alpha data, RGB data, and/or the like as described herein) from the additional Alpha data comprising the GPU tile based framebuffer compression format, such as by using the GPU of the client device and/or the like as described herein. In some examples, the operation 1110 may comprise rendering, at least in part, a full frame (e.g., for a full frame update) of the graphical user interface based, at least in part, on the additional RGB data and/or the additional Alpha data, such as by using the GPU of the client device and/or the like as described herein. In some examples, the operation 1110 may comprise rendering, at least in part, the at least one block (e.g., for a partial frame update) of the graphical user interface based, at least in part, on the additional RGB data and/or the additional Alpha data. In some examples, the operation 1110 may comprise generating and/or transmitting a full frame update request to an encoder device, a server, and/or the like as described herein (e.g., encoder device 102, electronic device 800, etc.). In some examples, the operation 1110 may comprise generating and/or transmitting a partial frame update request to an encoder device, a server, and/or the like as described herein (e.g., encoder device 102, electronic device 800, etc.). In some examples, a partial frame update request may identify at least one block, such as with a unique block identifier. In some examples, a full frame update request may identify a full frame, such as with a plurality of unique block identifiers for all blocks within a frame.

Various systems and processes described herein may include, or be implemented using, or in conjunction with, or for, a device or electronic device. A device or electronic device (e.g., electronic device 800 or the like as described herein) may be, for example, any electronic device equipped with one or more video codecs (e.g., a hardware and/or software encoder and/or decoder). Further, a device or electronic device may be one or more of a server (e.g., media server, web server, streaming server, and/or the like), streaming stick (e.g., Fire TV Stick, etc.), video camera (e.g., webcam, doorbell camera, security camera, and/or the like), game console, and/or similar electronic devices equipped with one or more video codecs and/or any other hardware (and/or software) componentry necessary to perform the various operations described herein.

Various systems and processes described herein may include and/or reference a target block. A target block may be, for example, any value, pixel, block, macroblock, tile and/or the like as described herein that is identified as the target of an Alpha block transform. For instance, a block, macroblock, and/or tile that shares at least one common value with another block, macroblock, and/or tile may be identified as a target block for applying, for example, a block constant transform, a coalesce last transform, a coalesce current transform and/or any other transform as described herein based, at least in part, on the characteristics (or attributes) or the respective target block.

Various systems and processes described herein may include and/or reference a duplicate block. A duplicate block may be, for example, any block, macroblock, and/or tile that is the same as (e.g., with respect to Alpha channel data) another block, macroblock, and/or tile (e.g., in the same frame, a previous frame, etc.).

As set forth above, certain methods or process blocks may be skipped or omitted in some implementations. Blocks or operations may be added to some implementations. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method for Alpha channel inter-frame and intra-frame compression, the method comprising:
receiving a first frame representative of a graphical user interface at a first time, wherein the first frame comprises RGBA data comprising RGB data and Alpha data;
dividing the first frame into a first macroblock set;
dividing the first macroblock set into a first block set, wherein each respective macroblock of the first macroblock set comprises a respective subset of blocks, wherein each respective block of the first block set comprises 16×16 pixels, and wherein each respective block of the first block set comprises respective Alpha data for each respective pixel within that respective block;
receiving a second frame representative of the graphical user interface at a second time, wherein the second frame comprises RGBA data comprising RGB data and Alpha data;
dividing the second frame into a second macroblock set;
dividing the second macroblock set into a second block set, wherein each respective macroblock of the second macroblock set comprises a respective subset of blocks, wherein each respective block of the second block set comprises 16×16 pixels, and wherein each block of the second block set comprises the Alpha data associated with each respective pixel;
comparing the first macroblock set to the second macroblock set;
identifying at least one target block that is in the second macroblock set, wherein the at least one target block shares a common Alpha value with at least one other block in at least one of the first frame or the second frame;
generating at least one transform block by applying at least one transform to the at least one target block;
generating at least one encoded non-target block by encoding at least one non-target block of the second frame using a GPU compression format, wherein the at least one non-target block is a unique block with respect to the first frame and the second frame;
generating a data packet comprising at least one transform block and the at least one encoded non-target block of the second frame; and
transmitting the data packet to a client device.

2. The method of claim 1, wherein comparing the first macroblock set to the second macroblock set comprises:
generating a first block buffer representative of the first frame, wherein the first block buffer comprises a first index indicating the first macroblock set organized into layers of rows;
generating a second block buffer representative of the second frame, wherein the second block buffer comprises a second index indicating the second macroblock set organized into layers of rows; and
searching each row of the first index and each row of the second index for the at least one target block in the second macroblock set, wherein the at least one target block shares at least an Alpha value with at least one of a respective block in the first macroblock set or a respective block in the second macroblock set.

3. The method of claim 2, wherein applying at least one transform to the at least one target block comprises:
replacing the at least one target block in the second macroblock set with a transform block comprising at least one of a transform type, a unique block identifier, a length value, a constant Alpha value, a raw block buffer, a raw macrobuffer, an encoded block buffer, an encoded macrobuffer, a reference value to the respective block in the first macroblock set, or a reference value to a similar block in the second macroblock set.

4. A method comprising:
receiving a first frame representative of a graphical user interface;
dividing the first frame into a first macroblock set, wherein each respective macroblock of the first macroblock set comprises a respective subset of blocks, wherein each respective block of the first macroblock set comprises respective Alpha data for each respective pixel within that respective block of the first macroblock set for a first time;

receiving a second frame representative of the graphical user interface;

dividing the second frame into a second macroblock set, wherein each respective macroblock of the second macroblock set comprises a respective subset of blocks, wherein each respective block of the second macroblock set comprises respective Alpha data for each respective pixel within that respective block of the second macroblock set for a second time;

searching the first macroblock set and the second macroblock set;

identifying at least one target block that is in the second macroblock set, wherein the at least one target block shares a common Alpha value with at least one other block in at least one of the first frame or the second frame;

generating at least one transform block by applying at least one transform to the at least one target block; and generating a data packet comprising the at least one transform block and at least one non-target block of the second frame.

5. The method of claim 4, comprising:

generating a first block buffer representative of the first frame, wherein the first block buffer comprises a first index indicating the first macroblock set organized into layers of rows; and generating a second block buffer representative of the second frame, wherein the first block buffer comprises a second index indicating the second macroblock set organized into layers of rows.

6. The method of claim 5, wherein searching the first macroblock set and the second macroblock set comprises:

searching each row of the first index and each row of the second index for the at least one target block in the second macroblock set, wherein the at least one target block shares at least an Alpha value with at least one of a respective block in the first macroblock set or a respective block in the second macroblock set.

7. The method of claim 4, wherein applying at least one transform to the at least one target block comprises:

replacing the at least one target block in the second macroblock set with a pseudo transform block comprising a unique block identifier or a cached pixel value referencing a block in the first frame.

8. The method of claim 4, wherein applying at least one transform to the at least one target block comprises:

replacing the at least one target block in the second macroblock set with a transform block comprising a block raw transform type, a unique block identifier, a length value, and a raw block buffer.

9. The method of claim 4, wherein applying at least one transform to the at least one target block comprises:

replacing the at least one target block in the second macroblock set with a transform block comprising a block encoded transform type, a unique block identifier, a length value, and an encoded block buffer, wherein the encoded block buffer is encoded using a GPU compression format.

10. The method of claim 9, comprising:

determining that a total size of an encoded macroblock comprising the transform block exceeds the length of a raw macroblock buffer; and replacing a respective macroblock comprising the transform block with a transform macroblock comprising a macroblock raw transform type, a unique macroblock identifier, a length value, and the raw macroblock buffer.

11. The method of claim 4, wherein applying at least one transform to the at least one target block comprises:

replacing the at least one target block in the second macroblock set with a transform block comprising a block constant transform type, a unique block identifier, and a constant Alpha value; or replacing a respective macroblock comprising the at least one target block in the second macroblock set with a transform macroblock comprising the macroblock constant transform type, a unique macroblock identifier, and the constant Alpha value, wherein the constant Alpha value is applied to all pixels within a respective block or respective macroblock.

12. The method of claim 4, wherein applying at least one transform to the at least one target block comprises:

replacing the at least one target block in the second macroblock set with a transform block comprising a coalesce last transform type, a unique block identifier, and a reference block identifier, wherein the reference block identifier indicates a reference block from the first frame to copy to a location of the at least one target block in the second frame.

13. The method of claim 4, wherein applying at least one transform to the at least one target block comprises:

replacing the at least one target block in the second macroblock set with a transform block comprising a coalesce current transform type, a unique block identifier, and a reference block identifier, wherein the reference block identifier indicates a reference block from the second frame to copy to a location of the at least one target block in the second frame, wherein the reference block identifier is a lower number than the unique block identifier.

14. An electronic device comprising:

at least one processor; and at least one computer readable media storing processor executable instructions which, when executed using the at least one processor, causes the electronic device to perform operations comprising:

receiving a first frame representative of a graphical user interface;

dividing the first frame into a first macroblock set, wherein each respective macroblock of the first macroblock set comprises a respective subset of blocks comprising Alpha data for respective pixels at a first time;

receiving a second frame representative of the graphical user interface;

dividing the second frame into a second macroblock set, wherein each respective macroblock of the second macroblock set comprises a respective subset of blocks comprising Alpha data for respective pixels at a second time;

searching the first macroblock set and the second macroblock set;

identifying at least one target block that is in the second macroblock set, wherein the at least one target block shares a common Alpha value with at least one other block in at least one of the first frame or the second frame;

generating at least one transform block by applying at least one transform to the at least one target block; and generating a data packet comprising at least one transform block and at least one non-target block of the second frame.

15. The electronic device of claim 14, wherein the at least one computer readable media store processor executable instructions which, when executed using the at least one processor, causes the electronic device to perform operations comprising:

generating a first block buffer representative of the first frame, wherein the first block buffer comprises a first index indicating the first macroblock set organized into layers of rows; and generating a second block buffer representative of the second frame, wherein the first block buffer comprises a second index indicating the second macroblock set organized into layers of rows.

16. The electronic device of claim 15, wherein the at least one computer readable media store processor executable instructions which, when executed using the at least one processor, causes the electronic device to perform operations comprising:

searching each row of the first index and each row of the second index for the at least one target block in the second macroblock set, wherein the at least one target block shares at least an Alpha value with at least one of a respective block in the first macroblock set or a respective block in the second macroblock set.

17. The electronic device of claim 14, wherein the at least one computer readable media store processor executable instructions which, when executed using the at least one processor, causes the electronic device to perform operations comprising:

replacing the at least one target block in the second macroblock set with a transform block comprising a block raw transform type, a unique block identifier, a length value, and a raw block buffer.

18. The electronic device of claim 14, wherein the at least one computer readable media store processor executable instructions which, when executed using the at least one processor, causes the electronic device to perform operations comprising:

replacing the at least one target block in the second macroblock set with a transform block comprising a block encoded transform type, a unique block identifier, a length value, and an encoded block buffer, wherein the encoded block buffer is encoded using a GPU compression format.

19. The electronic device of claim 14, wherein the at least one computer readable media store processor executable instructions which, when executed using the at least one processor, causes the electronic device to perform operations comprising:

replacing the at least one target block in the second macroblock set with a transform block comprising a coalesce last transform type, a unique block identifier, and a reference block identifier, wherein the reference block identifier indicates a reference block from the first frame to copy to a location of the at least one target block in the second frame.

20. The electronic device of claim 14, wherein the at least one computer readable media store processor executable instructions which, when executed using the at least one processor, causes the electronic device to perform operations comprising:

replacing the at least one target block in the second macroblock set with a transform block comprising a coalesce current transform type, a unique block identifier, and a reference block identifier, wherein the reference block identifier indicates a reference block from the second frame to copy to a location of the at least one target block in the second frame, wherein the reference block identifier is a lower number than the unique block identifier.

* * * * *